United States Patent
Budd et al.

(10) Patent No.: US 8,496,340 B2
(45) Date of Patent: Jul. 30, 2013

(54) RETROREFLECTIVE ARTICLES AND RETROREFLECTIVE ELEMENTS COMPRISING A SPHERICAL CORE AND TWO CONCENTRIC OPTICAL INTERFERENCE LAYERS

(75) Inventors: Kenton D. Budd, Woodbury, MN (US); Matthew H. Frey, Cottage Grove, MN (US); Christopher K. Haas, St. Paul, MN (US); Vivek Krishnan, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 326 days.

(21) Appl. No.: 12/808,529

(22) PCT Filed: Dec. 16, 2008

(86) PCT No.: PCT/US2008/086946
§ 371 (c)(1),
(2), (4) Date: Aug. 23, 2010

(87) PCT Pub. No.: WO2009/082644
PCT Pub. Date: Jul. 2, 2009

(65) Prior Publication Data
US 2010/0302639 A1    Dec. 2, 2010

Related U.S. Application Data

(60) Provisional application No. 61/016,210, filed on Dec. 21, 2007.

(51) Int. Cl.
*G02B 5/128*  (2006.01)
(52) U.S. Cl.
USPC ........... 359/536; 359/542; 359/581; 359/584; 359/585; 359/586

(58) Field of Classification Search
USPC ......... 359/534–540, 542, 580, 581, 584–586, 359/589
See application file for complete search history.

(56) References Cited

U.S. PATENT DOCUMENTS

| | | | |
|---|---|---|---|
| 2,326,634 A | 8/1943 | Gebhard | |
| 2,963,378 A | 12/1960 | Palmquist | |

(Continued)

FOREIGN PATENT DOCUMENTS

| | | |
|---|---|---|
| CN | 2118741 | 10/1992 |
| EP | 0175513 | 3/1986 |

(Continued)

OTHER PUBLICATIONS

CIE Technical Report: Colorimetry, 1931 version, pp. 9-10. ISBN 3 901 906 33 9.

(Continued)

*Primary Examiner* — Frank Font
(74) *Attorney, Agent, or Firm* — Julie Lapos-Kuchar; Sandra K. Nowak; Thomas M. Spielbauer

(57) ABSTRACT

Retroreflective elements and articles that include such elements. The retroreflective elements (100) include a solid spherical core (110) having an outer surface. A first complete concentric optical interference layer (112) overlays the outer surface of the core providing a first interface between the core and the first optical interference layer, and a second complete concentric optical interference layer (122) overlays the first optical interference layer to provide a second interface between the first optical interference layer and the second optical interference layer. In some embodiments, a third complete concentric optical interference layer overlays the second optical interference layer to provide a third interface between the second optical interference layer and the third optical interference layer. The retroreflective articles include a substrate having a first major surface and a second major surface with a plurality of the retroreflective elements affixed along the first major surface of the substrate.

38 Claims, 3 Drawing Sheets

U.S. PATENT DOCUMENTS

| | | | |
|---|---|---|---|
| 3,036,928 A | 5/1962 | Poole | |
| 3,046,851 A | 7/1962 | De Vries | |
| 3,499,857 A | 3/1970 | Searight | |
| 3,523,029 A | 8/1970 | Searight | |
| 3,645,933 A | 2/1972 | Flint | |
| 3,700,305 A * | 10/1972 | Bingham | 359/540 |
| 3,700,478 A * | 10/1972 | Bingham | 59/541 |
| 3,767,291 A | 10/1973 | Johnson | |
| 3,832,038 A | 8/1974 | Johnson | |
| 3,884,554 A * | 5/1975 | Lemelson | 359/558 |
| 4,248,932 A | 2/1981 | Tung | |
| 4,367,920 A | 1/1983 | Tung | |
| 4,564,556 A | 1/1986 | Lange | |
| 4,630,891 A | 12/1986 | Li | |
| 4,721,743 A | 1/1988 | Cavitt | |
| 4,758,469 A | 7/1988 | Lange | |
| 4,832,448 A * | 5/1989 | Jones | 359/581 |
| 4,988,555 A | 1/1991 | Hedblom | |
| 5,171,624 A * | 12/1992 | Walter | 428/156 |
| 5,227,221 A | 7/1993 | Hedblom | |
| 5,376,431 A * | 12/1994 | Rowland | 428/164 |
| 5,543,177 A | 8/1996 | Morrison | |
| 5,612,119 A | 3/1997 | Olsen | |
| 5,614,286 A * | 3/1997 | Bacon et al. | 428/161 |
| 5,620,775 A | 4/1997 | LaPerre | |
| 5,670,227 A | 9/1997 | Hedblom | |
| 5,673,148 A | 9/1997 | Morris | |
| 5,706,133 A | 1/1998 | Orensteen | |
| 5,777,791 A | 7/1998 | Hedblom | |
| 5,916,399 A | 6/1999 | Olsen | |
| 5,929,160 A | 7/1999 | Krepski | |
| 6,000,804 A * | 12/1999 | Kimura | 359/536 |
| 6,026,809 A | 2/2000 | Abrams | |
| 6,132,132 A | 10/2000 | Pirotta | |
| 6,142,146 A | 11/2000 | Abrams | |
| 6,157,486 A * | 12/2000 | Benson et al. | 359/487.05 |
| 6,166,106 A | 12/2000 | Purgett | |
| 6,245,700 B1 | 6/2001 | Budd | |
| 6,288,837 B1 * | 9/2001 | Hubbard | 359/359 |
| 6,288,842 B1 | 9/2001 | Florczak | |
| 6,365,262 B1 | 4/2002 | Hedblom | |
| 6,376,574 B1 | 4/2002 | Helmer | |
| 6,462,127 B1 | 10/2002 | Ingrisch | |
| 6,966,660 B1 | 11/2005 | Buccellato | |
| 6,978,896 B2 * | 12/2005 | Budd et al. | 206/575 |
| 7,036,944 B2 * | 5/2006 | Budd et al. | 359/536 |
| 7,049,367 B2 | 5/2006 | Mazanek | |
| 7,224,533 B2 * | 5/2007 | Lerner et al. | 359/652 |
| 7,247,386 B2 | 7/2007 | Hooftman | |
| 7,351,470 B2 | 4/2008 | Draheim | |
| 7,396,579 B2 | 7/2008 | Owusu | |
| 2002/0163179 A1 | 11/2002 | Dubner | |
| 2003/0193718 A1 * | 10/2003 | Budd et al. | 359/536 |
| 2003/0194490 A1 * | 10/2003 | Budd et al. | 427/212 |
| 2007/0110960 A1 | 5/2007 | Frey | |
| 2008/0176973 A1 * | 7/2008 | Qiu et al. | 523/135 |
| 2008/0224462 A1 | 9/2008 | Dubner | |

FOREIGN PATENT DOCUMENTS

| | | |
|---|---|---|
| EP | 0 947 266 | 10/1999 |
| EP | 0949027 | 10/1999 |
| EP | 1300255 | 4/2003 |
| GB | 1 477 175 | 6/1977 |
| GB | 1477175 | 6/1977 |
| JP | 2001-048586 | 2/2001 |
| JP | 2004-184646 | 7/2004 |
| WO | WO 92/19994 | 11/1992 |
| WO | WO 96/20304 | 7/1996 |
| WO | WO 99/55537 | 11/1999 |
| WO | WO 00/42113 | 7/2000 |
| WO | WO 01/42823 | 6/2001 |
| WO | WO 01/80208 | 10/2001 |
| WO | WO 02/20275 | 3/2002 |
| WO | WO 02/072368 | 9/2002 |
| WO | WO 02/085638 | 10/2002 |
| WO | WO 03/070483 | 8/2003 |
| WO | WO 03/087895 | 10/2003 |
| WO | WO 2005/022210 | 3/2005 |
| WO | WO 2007/070650 | 6/2007 |
| WO | WO 2009/082601 | 7/2009 |
| WO | WO 2009/085550 | 7/2009 |
| WO | WO 2009/105142 | 8/2009 |

OTHER PUBLICATIONS

Johnson, "U.S. Defensive Publication No. T987,003", pp. 1-3, Oct. 2, 1979.

Zukauskas, "Introduction to Solid-State Lighting", Chapter 2: Vision, Photometry, and Colorimetry, pp. 7-19, John Wiley & Sons, 2002.

Written Opinion of the ISA for International Application No. PCT/US2008/086946, 7 pgs.

International Search Report for PCT/US2008/086946, 4 pgs.

Page 7, Final Office Action in U.S. Appl. No. 12/808,492, mailed Mar. 27, 2013.

* cited by examiner

US 8,496,340 B2

RETROREFLECTIVE ARTICLES AND RETROREFLECTIVE ELEMENTS COMPRISING A SPHERICAL CORE AND TWO CONCENTRIC OPTICAL INTERFERENCE LAYERS

CROSS REFERENCE TO RELATED APPLICATIONS

This application is a national stage filing under 35 U.S.C. 371 of PCT/US2008/086946, filed Dec. 16, 2008, which claims priority to U.S. Provisional Application No. 61/016,210, filed Dec. 21, 2007, the disclosure of which is incorporated by reference in its/their entirety herein.

The present invention relates to retroreflective elements and to articles comprising retroreflective elements.

BACKGROUND

"Retroreflectivity" refers to the ability of an article, if engaged by a beam of light, to reflect that light substantially back in the direction of the light source. Beaded retroreflective constructions are known in the art and generally include a plurality of transparent spherically shaped beads affixed to a substrate along at least one major surface thereof. Exemplary retroreflective articles include signs, security cards, pavement markings and garments. In beaded retroreflective constructions, substantially collimated light (e.g., a beam of light from an automobile headlight) enters the front surfaces of the beads, is refracted, and impinges on a reflector at or near the back surfaces of the beads. The optical characteristics of the beads and reflectors can be tailored so that a significant amount of light is returned antiparallel or nearly antiparallel to the incident light.

Typical reflectors include those utilizing pigments as well as conformal reflective coatings that have been applied to the back side of a layer of transparent beads, for example in a planar construction comprising a monolayer of beads adhered to a backing or substrate. Pigments can be used as reflectors by first dispersing them in a binder and coating the dispersion onto the back surface of a layer that comprises a plurality of beads or by partially imbedding a layer of beads in the pigmented binder. Reflective pigments include, for example, titania particles, mica flakes, other powders and the like. Conformal reflective coatings are normally applied to the back side of the reflective beads (e.g., between the beads and the substrate) in a planar construction. Conformal reflective coatings include metal thin films such as aluminum and silver, and dielectric coatings such as metal fluorides and zinc sulfide. In the construction of retroreflective articles, choosing one type of reflector over another can depend on a variety of factors including the desired daylight appearance of the article, material and manufacturing costs, the desired level of retroreflective brightness and the overall structure of the article and the associated manufacturing processes. Reflectors made from pigment are normally inexpensive to manufacture and can provide desired daytime features, such as a bright white appearance when exposed to bright, diffuse lighting. Conformal reflective coatings applied to the back side of reflective beads in planar constructions produce high retroreflective brightness but can be expensive, metallic grey in color, or have other less desirable features.

Bead cores coated with a single complete concentric optical interference layer are known to produce retroreflective elements that provide covert interference colors and retrochromic patterns. The term "retrochromic" refers to the ability of an article or a region thereof, when viewed in retroreflective mode, to exhibit a retroreflected color that is different from the color exhibited when the object or region is viewed in diffuse lighting. The art has also noted an effect of the refractive index of a single complete concentric optical interference layer on the saturation and intensity of retrochromic colors. It has been suggested that the medium behind the optical interference layer (e.g., between the retroreflective element and the substrate or backing) can provide a high refractive index contrast interface between the coating and the medium. The art suggests that a thicker coating applied to a bead already comprising a complete concentric optical interference layer, can be used to adjust the interference effect by fixing refractive index differences of the interfaces.

Further improvements are desired in retroreflective elements and in articles comprising such elements.

SUMMARY

In one aspect, the present invention provides a retroreflective element comprising:
  a solid spherical core comprising an outer core surface, the outer core surface providing a first interface;
  a first complete concentric optical interference layer having an inner surface overlying the core surface and an outer surface, the outer surface of the first complete concentric optical interference layer providing a second interface;
  a second complete concentric optical interference layer having an inner surface overlying the outer surface of the first complete concentric optical interference layer and an outer surface, the outer surface of the second complete concentric optical interference layer providing a third interface.

In another aspect, the retroreflective element further comprises a third complete concentric optical interference layer having an inner surface overlying the outer surface of the second complete concentric optical interference layer and an outer surface, the outer surface of the third complete concentric optical interference layer providing a fourth interface.

In another aspect, a retroreflective article is provided, comprising:
  A substrate having a first major surface and a second major surface;
  A plurality of the foregoing retroreflective elements affixed along the first major surface of the substrate, the article being retroreflective.

Unless otherwise indicated, the terms used herein are to be construed in a manner consistent with the understanding of those skilled in the art. For the sake of clarity, the following terms are to be understood as having the meanings given herein:

"Light" refers to electromagnetic radiation having one or more wavelengths in the visible (i.e., from about 380 nm to about 780 nm), ultraviolet (i.e., from about 200 nm to about 380 nm), and/or infrared (i.e., from about 780 nm to about 100 micrometers) regions of the electromagnetic spectrum.

"Refractive index" refers to the index of refraction at a wavelength of 589.3 nm corresponding to the sodium yellow d-line, and a temperature of 20° C., unless otherwise specified. The term "refractive index" and its abbreviation "RI" are used interchangeably herein.

"Retroreflective mode" refers to a particular geometry of illumination and viewing that includes engaging an article with a beam of light and viewing the illuminated article from substantially the same direction, for example within 5 degrees, 4 degrees, 3, degrees, 2 degrees, or 1 degree of the illumination direction. Retroreflective mode can describe the geometry in which a person views an article or the geometry in which an instrument measures the reflectivity of an article.

"Retroreflective brightness" refers to the effectiveness with which an object or ensemble of objects, for example a retroreflective element or an ensemble of elements, or for example an article comprising one or more retroreflective elements, returns incident light back in the direction (or nearly in the direction) from which it came. Retroreflective brightness relates to the intensity of light that is retroreflected from an object, versus the intensity of light that is incident on the object.

"Coefficient of Retroreflection" (Ra) is a standard measure of the retroreflective brightness of an object, and can be expressed in units of candelas per square meter per lux, or $Cd/lux/m^2$, or Cpl. These units and measurement instruments that report the coefficient of retroreflection in such units, weight the retroreflective brightness with the luminosity function. The luminosity function describes the dependence of human eye sensitivity on the wavelength of light and is non-zero for wavelengths between approximately 380 nanometers and 780 nanometers, thus defining the visible region of the electromagnetic spectrum.

"Complete concentric optical interference layer" or "optical interference layer" refers to a translucent or transparent coating surrounding and directly adjacent to essentially the entire surface (i.e., not only a selected portion of the surface, for example only the back surface) of a bead core or surrounding and directly adjacent to the outside surface of another, inner complete concentric optical interference layer, the complete concentric optical interference layer being of essentially uniform thickness.

"Reflector" refers to a specular or diffuse reflective material that is placed in a retroreflective article at or near the focal position behind a retroreflective element in a retroreflective article. The reflective material can be a diffuse light-scattering or metallic material, or one or more layers of transparent material components that creates one or more reflective interfaces.

For clarity, in embodiments where more than one reflector is present at or near the focal position behind a spherical bead core in a retroreflective article, the material in contact with or closest to the outer surface of the bead is designated the "primary reflector." Additional reflectors farther from the back surface of the bead are designated as "auxiliary reflectors". A stack of directly adjacent dielectric layers is considered to be a single "reflector" for the purpose of designating primary and auxiliary reflectors. For example, an article comprising a bead having two or more complete concentric optical interference layers with back surface embedded in a pigmented binder has complete concentric optical interference layers as a primary reflector and a pigmented binder as an auxiliary reflector.

"Region" refers to a continuous portion of an article. A region typically has a boundary or general extent that is discernible to a viewer.

Those skilled in the art will more fully appreciate the scope of the present invention upon consideration of the remainder of the disclosure including the Detailed Description, the drawings and the appended claims.

BRIEF DESCRIPTION OF THE DRAWINGS

The various Figures herein are not to scale but are provided in the description of the embodiments. In describing embodiments of the invention, reference is made to the Figures in which features of the embodiments are indicated with reference numerals, with like reference numerals indicating like features, and wherein.

DETAILED DESCRIPTION

Figure 1:
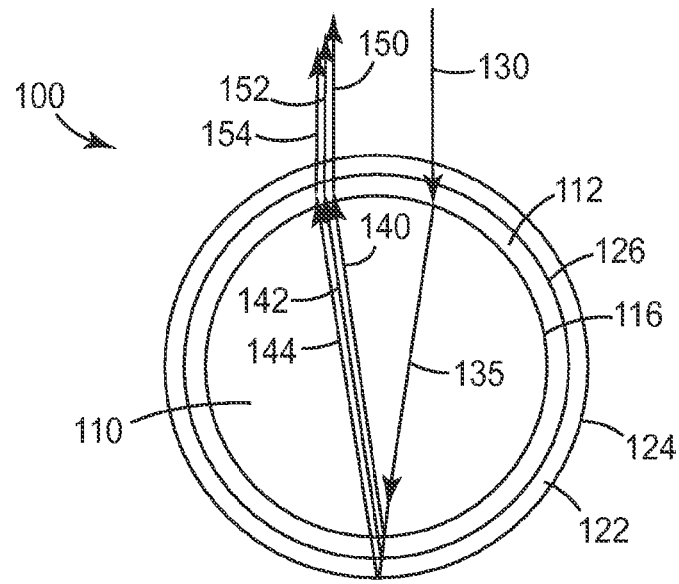
FIG. 1 is a cross-sectional view of an embodiment of a retroreflective element according to the invention.

The present invention provides retroreflective elements in the form of coated beads and articles comprising such retroreflective elements. Retroreflective elements according to the invention and articles comprising such retroreflective elements exhibit retroreflectivity that is enhanced by interference phenomena arising from the retroreflective elements that are comprised of two or more complete concentric optical interference layers deposited over a solid spherical bead core. Interference-enhanced retroreflectivity includes the achievement of higher retroreflective brightness without retroreflective color or the achievement of a unique combination of retroreflective brightness and retroreflective color through the design and deposition of two or more complete concentric optical interference layers on a spherical core. Higher retroreflective brightness is achieved for the retroreflective elements and articles of the invention as compared with the retroreflective brightness for similar articles comprising retroreflective elements in the form of bead cores having no more than one complete concentric optical interference layer.

Retroreflective brightness can be measured for various angles between the incident and reflected light (the observation angle) but is not limited to a particular range of angles. For some applications, effective retroreflectivity is desired at a return angle of zero degrees (anti-parallel to the incident light). For other applications, effective retroreflectivity is desired over a range of return angles such as from 0.1 degree to 1.5 degrees. In the case of visible light illumination, retroreflective brightness is described by the coefficient of retroreflection (Ra).

Articles that comprise retroreflective elements having two complete concentric optical interference layers deposited over a spherical core exhibit coefficient of retroreflection (Ra) values that are greater than similar articles having retroreflective elements as a part thereof but which do not include two or more concentric optical interference layers (e.g., the retroreflective elements include zero or one concentric optical interference layer). Articles constructed according to the invention may or may not include an auxiliary reflector as a part thereof. However, the aforementioned improvements in the coefficient of retroreflection are observed for articles that include an auxiliary reflector as well as for articles that lack an auxiliary reflector. For articles that do not include an auxiliary reflector, the coefficient of retroreflection is increased in some embodiments by a factor greater than 2.5, in some embodiments by a factor greater than 3, in some embodiments by a factor greater than 4, in some embodiments by a factor greater than 5, in some embodiments by a factor greater than 6, and in some embodiments by a factor greater than 7 as compared with other articles having no auxiliary reflector but which include retroreflective elements in the form of beads where the beads include zero or only one concentric optical interference layer. For articles that include an auxiliary reflector (e.g., a titania-pigmented diffuse-scattering bead binder into which the retroreflective elements are partially embedded), the coefficient of retroreflection is increased in some embodiments by a factor greater than 2.5, in some embodiments by a factor greater than 3, and in some embodiments by a factor greater than 3.5 as compared with other articles having an auxiliary reflector but which include retroreflective elements in the form of beads where the beads include zero or only one concentric optical interference layer.

Articles of the invention that comprise retroreflective elements having three complete concentric optical interference layers deposited over a spherical core, exhibit coefficient of retroreflection (Ra) values that are greater than the same articles with the same bead core, but having zero or only one optical interference layer. Improvement in the coefficient of retroreflection is observed for articles that include an auxiliary reflector as well as for articles that do not include an auxiliary reflector. Articles that do not include an auxiliary reflector show increases in the coefficient of retroreflection in some embodiments by a factor greater than 3, in some embodiments by a factor greater than 4, in some embodiments by a factor greater than 6, in some embodiments by a factor greater than 8, in some embodiments by a factor greater than 10, in some embodiments by a factor greater than 12, and in some embodiments by a factor greater than 14. Articles that include an auxiliary reflector (e.g., a titania-pigmented diffuse-scattering bead binder into which the retroreflective elements are partially embedded), still show a coefficient of retroreflection increased in some embodiments by a factor greater than 3, in some embodiments by a factor greater than 4, in some embodiments by a factor greater than 5, and in some embodiments by a factor greater than 6.

Retroreflective elements provided by the invention include a spherical core with two or more coated layers applied to the core, the two or more coated layers forming complete concentric optical interference layers that surround the core. The first or innermost optical interference layer covers and is adjacent to the outer surface of the spherical bead core. A second complete concentric optical interference layer covers and is adjacent to the outer surface of the first or innermost concentric optical interference layer. While the complete concentric optical interference layers ought to cover the entire surface of the spherical bead core, the optical interference layers may include small pinholes or small chip defects that penetrate the layer without impairing the optical properties of the retroreflective element. Optionally, retroreflective elements provided by the present invention may comprise additional complete concentric optical interference layers with each successive optical layer covering a previously deposited layer (e.g., a third concentric optical interference layer covers the second concentric optical interference layer; a fourth layer covers the third layer, etc.). By concentric, what is meant is that each such optical interference layer on a given bead core is a spherically shaped shell shape, sharing its center with the center of the core.

It is within the scope of the present invention to include a variety of retroreflective elements as components of any of a variety of articles. Some of the retroreflective elements incorporated into such articles will comprise the retroreflective elements described herein according to the present invention while other retroreflective elements may be outside the scope of the invention. For example, some of the retroreflective elements may have no concentric optical interference layers. In some embodiments, the retroreflective elements may be within the scope of the invention but may include a variety of inventive retroreflective elements that, for example, are different in the construction of their optical interference layers. In other words, the retroreflective elements may comprise different constructions in which the concentric optical interference layers are of different materials and/or different thicknesses from one retroreflective element to the next. In such embodiments, the first or innermost optical interference layer may vary in thickness from one retroreflective element to another by more than twenty five percent. In some embodiments, one or more additional coated layers may not be concentrically coated. In some embodiments, the retroreflective elements may include two concentric optical interference layers as well as elements that include three or more concentric optical interference layers.

Complete concentric optical interference layers are applied to a spherical core to provide a retroreflective element with enhanced retroreflective brightness. When placed in an article, the retroreflective elements provide a retroreflective brightness that is greater than retroreflective brightness of identical articles comprising other forms of retroreflective elements or the like. In some embodiments, the color of the retroreflected light is the same or similar to that of the incident light. For example, the retroreflected light exhibits little or no color change from white incident light. In still other embodiments, the optical interference layers are applied to the core so that, when placed in an article, the retroreflective elements provide a retroreflective color. In some embodiments, a discernable pattern on the surface of an article or substrate is viewable in the retroreflective mode but not under diffuse lighting. In some embodiments, retrochromic characteristics of the retroreflective elements may also be used to enhance the existing color of an article, i.e., the retroreflected color of the retroreflective elements matches the color of the article when viewed in diffuse lighting.

A complete, concentric optical interference layer for light on a bead core creates two reflective interfaces at the back of a retroreflective element. The thickness of the coating is such that the optical thickness results in a constructive or destructive interference condition for one or more wavelengths that fall within the wavelength range corresponding to visible light (approximately 380 nanometers to approximately 780 nanometers). Optical thickness refers to the physical thickness of a coating multiplied by its index of refraction. Such constructive or destructive interference conditions are periodic with increasing optical thickness for the optical interference coating, up to the coherence length of the illumination. With increasing coating thicknesses, constructive interference for a given wavelength will occur first when the optical path through the coating and back again, combined with any phase inversions caused by the sign of refractive index change at either or both interfaces, leads to a phase difference of $2\pi$ radians for the two components of light that reflect from the two interfaces. With further increase in thickness, the same constructive interference condition will be achieved again when the phase difference is equal to $4\pi$ radians. Similar behavior will occur for further increases in thickness. The thickness period that separates successive occurrences of the constructive interference condition (that is, the increment in thickness for the coating which leads to repetition of nominally the same interference condition for a given wavelength (in vacuo) of light that is reflected from the two surfaces of the coating) is given by one half of the wavelength in vacuo divided by the index of refraction of the coating. Each occurrence of a given interference condition with increasing coating thickness from zero nanometers can be assigned a period number (e.g., n=1, 2, 3 . . . ). When retroreflective elements comprising an optical interference layer are illuminated with broadband light (light comprising many wavelengths, for example white light), a range of interference effects characterizes the retroreflection behavior for the different wavelengths. These optical phenomena become more complex when more than one optical interference layer is applied to the spherical core.

It has been found that the retroreflected color and brightness of retroreflective articles comprising retroreflective elements having two or more complete concentric optical interference layers exhibit periodic behaviors and interdependencies with increasing coating layer thicknesses. Retroreflective elements made with multiple complete concentric optical interference layers, or articles comprising such retroreflective elements, exhibit oscillations of magnitude (e.g., peaks and valleys) in the coefficient of retroreflection (Ra) as one or more of the interference layers increases in thickness. In some embodiments, high coefficient of retroreflection is achieved for white light illumination without the generation of color for the retroreflected light. In other embodiments, high coefficient of retroreflection is generated for white light illumination accompanied by the generation of retroreflected light of color. In some embodiments, the articles can include regions of retroreflective elements that provide any of a variety of displays or designs having a distinctive appearance and/or color under diffuse lighting, as well as a retroreflected color or lack of retroreflected color with a high coefficient of retroreflection under white light illumination when viewed in a retroreflective viewing mode.

The coherence length for non-laser light (for example light produced by an incandescent lamp, a gas discharge lamp, or a light-emitting diode) limits the values of n (and hence the total coating thickness) for which strong interference effects are observed. For non-laser light, interference effects tend to vanish for thicknesses corresponding to n=10 or more, and are greatly diminished at about half of that thickness. For retroreflective elements partially embedded in adhesive with an index of refraction of approximately 1.55, illuminated on their air-exposed side, and comprising a single complete concentric optical interference coating with refractive index of about 2.4, five peaks in photopically weighted retroreflective brightness are established by interference coatings of thicknesses ranging from zero nanometers up to approximately 600 nanometers. These physical thickness values correspond to an optical thickness of up to about 1500 nm. For articles comprising retroreflective elements with a single complete concentric optical interference coating having a refractive index of about 1.4, five peaks in photopically weighted retroreflective brightness are established by interference coatings of thicknesses ranging from zero nanometers up to approximately 1200 nanometers, corresponding to an optical thickness of less than 1700 nm. In some embodiments, a visible light interference layer comprises a coating with an optical thickness less than about 1500 nm.

The retroreflective elements of the invention may be included in the construction of any of a variety of articles, and the retroreflective elements may be combined with other reflective and/or retroflective materials including for example uncoated retroreflective glass beads having a high index of refraction. Retroreflective articles according to the present invention may optionally include one or more auxiliary reflectors wherein the retroreflective elements and the auxiliary reflector act collectively to return fractions of incident light back in the direction of the source. In some embodiments, a suitable auxiliary reflector is a diffuse light-scattering pigmented binder into which retroreflective elements are partially embedded. A pigmented binder is an auxiliary reflector when the pigment type and loading are selected to create a diffuse-scattering material (for example, greater than 75% diffuse reflection), as opposed to when the selection of pigment and loading are done simply to color a bead binder. Examples of pigments that lead to diffuse scattering include titanium dioxide particles and calcium carbonate particles.

In other embodiments, a suitable auxiliary reflector comprises a specular-pigmented binder into which retroreflective elements are partially embedded. Examples of specular pigments include mica flakes, titanated mica flakes, pearlescent pigments, and nacreous pigments.

In still other embodiments, a suitable auxiliary reflector is a metal thin film that is selectively placed behind the retroreflective element in a retroreflective article.

In still another embodiment, a suitable auxiliary reflector is a dielectric stack of thin films selectively placed behind the retroreflective element in a retroreflective article.

In the case of a retroreflective article wherein the index of refraction of the retroreflective element is between 1.5 and 2.1 and the front surface of the retroreflective element is exposed to air, auxiliary reflectors can be placed adjacent to the back side of the retroreflective elements. In the case of a retroreflective article wherein the retroreflective element is enclosed on its front surface with a transparent material that contacts its front surface or is covered on its front surface by water when in use, auxiliary reflectors can be advantageously used but are often spaced behind the back surface of the retroreflective elements, depending on the refractive index of the retroreflective element.

In some embodiments, the present invention provides retroreflective articles for which the need for auxiliary reflectors is optional. Consequently, use of the retroreflective elements of the invention can provide enhanced retroreflective brightness as well as reduced manufacturing costs as compared with the cost of manufacturing similar articles that require auxiliary reflectors or alternative primary reflectors. Moreover, the elimination of alternative or auxiliary reflectors can improve the ambient-lit appearance and durability of retroreflective articles made with retroreflective elements according to the invention.

Retroreflective articles of the invention made without auxiliary reflectors typically include a plurality of retroreflective elements partially embedded in a transparent (colored or non-colored), non-light-scattering, non-reflective binder (for example a clear, colorless, polymeric binder), and wherein the focal position for light incident on the retroreflective elements is within the binder or at the interface between the retroreflective element and the binder. In some constructions, retroreflective elements include spherical cores in the form of microspheres having an index of refraction of about 1.9. The retroreflective elements are partially embedded in a clear, colorless binder and their front surfaces are exposed to air, providing focal positions near the interface between the back side of the retroreflective elements and the binder. It has been noted that multiple complete concentric optical interference layers applied to the microspheres can increase the coefficient of retroreflection (Ra).

Articles comprising microspheres with an index of refraction of about 1.9 but without concentric optical interference layers, embedded in a clear acrylate adhesive, typically exhibit an Ra of approximately 8 Cd/lux/m$^2$ at −4 degrees entrance angle and 0.2 degrees observation angle. The application of a single complete concentric optical interference layer of low index of refraction (for example 1.4) or high index of refraction (e.g., 2.2) to the microspheres increases the Ra to as high as 18 Cd/lux/m² and as high as 30 Cd/lux/m², respectively. In the present invention, the use of two complete concentric optical interference layers over the microsphere core, when placed in an article as described above, provide an increase in the Ra to greater than about 50 Cd/lux/m² and as high as about 59 Cd/lux/m². When articles have been made comprising microspheres having three complete concentric optical interference layers, the Ra has increased to greater than 100 Cd/lux/m² and to as high as 113 Cd/lux/m². Thus, the retroreflective elements of the invention and articles made with such retroreflective elements exhibit useful levels of retroreflection in the absence of auxiliary reflectors.

Referring now to the drawings, FIG. 1 illustrates, in cross-section, an embodiment of a retroreflective element 100 according to the present invention. The retroreflective element 100 includes a transparent substantially spherical core 110 having and outer surface that provides a first interface. A first concentric optical interference layer 112 includes an inner surface that overlays the first interface of the core 110. Second concentric optical interference layer 122 overlies the first concentric optical interference layer 112. Layer 122 has an interior surface that contacts the exterior or outermost surface of first layer 112, forming a second interface 126 and an exterior surface that forms the outermost surface of the retroreflective element 100 and provides a third interface 124. The first and second concentric optical interference layers 112, 122 are substantially uniform over the surface of spherical core 110.

Light is reflected at interfaces between materials possessing different refractive indexes (e.g., having a difference in refractive indexes of at least about 0.1). A sufficient difference in the refractive indexes of the core 110 and first optical interference layer 112 gives rise to a first reflection at first interface 116. Similarly, a sufficient difference in the refractive indexes of first optical interference layer 112 and second optical interference layer 122 gives rise to a second reflection at second interface 126. A sufficient difference in the refractive indexes of second optical interference layer 122 and any background medium (e.g., vacuum, gas, liquid, solid) contacting second optical interference layer 122 gives rise to a third reflection at third interface 124 of the retroreflective element 100.

Incident beam of light 130 is shown in FIG. 1 as being directed at retroreflective element 100. Light 130 is largely transmitted through both the second optical interference layer 122 and the first optical interference layer 112 and enters core 110. A portion of the incident light 130 may be reflected at third interface 124 or at second interface 126 or first interface 116. Retroreflection results from the portion of light 130 that enters core 110 and is focused by refraction onto the opposite side of core 110. The refracted light 135 encounters first interface 116 at the back of core 110, some of refracted light 135 is reflected back as reflected light 140 towards the front of the retroreflective element 100 where it ultimately emerges from the retroreflective element as retroreflected light 150 in a direction that is substantially anti-parallel to incident light 130. Similarly, another portion of the focused light passes through optical interference layer 112 and is reflected back as reflected light 142 at second interface 126. Reflected light 142 ultimately emerges from the retroreflective element as retroreflected light 152 in a direction that is substantially anti-parallel to incident light 130. Still another portion of the focused light passes through both of the optical interference layers 112 and 122 and is reflected back at third interface 124 as reflected light 144. The exterior surface of the optical interference layer 122 forms third interface 124 with the medium in which the retroreflective element 100 is disposed (e.g., gas, liquid, solid, or vacuum). Reflected light 144 ultimately emerges from the retroreflective element as retroreflected light 154 in a direction that is substantially anti-parallel to incident light 130. A portion of incident light is not reflected in the manner described but passes entirely through the concentrically coated retroreflective element. Another portion of the incident light is reflected from the front surface of the retroreflective element and never enters the core.

Interference between reflected light 140, 142, 144 and in turn retroreflected light 150, 152, 154 may give rise to a change in intensity or color of the retroreflected light. A plurality of retroreflective elements 100 can provide bright retroreflection, including high coefficient of retroreflection, and/or retrochromic properties that enhance the appearance of an article by providing a covert color, design, message or the like. A desired interference effect can be obtained by manufacturing the retroreflective element 100 with optical interference layers 112 and 122 of different materials and by selecting the thicknesses and refractive indexes of those materials so that the aforementioned retroreflected light 150, 152, 154 desirably interfere with each other.

In some embodiments, the proper selection of materials, thicknesses and refractive indexes for the optical interference layers 112 and 122, retroreflective element 100 can provide retroreflected light 150, 152, 154 that is brighter than retroreflected light (e.g., in the form of higher coefficient of retroreflection) from other retroreflective elements such as those in the form of uncoated beads, for example. When incorporated in an article, a plurality of retroreflective elements 100 provide retroreflective properties that enhance the visibility of the article. Constructive interference between reflected light 140, 142, 144 and in turn retroreflected light 150, 152, 154 gives rise to unexpected increases in the brightness or intensity of the retroreflected light, for example visible retroreflected light. In some embodiments, coating thicknesses for the two optical interference layers can be optimized to provide maximum retroreflectivity when the layers are alternating layers of silica and titania and where the core comprises a glass bead having a diameter measuring from about 30 µm to about 90 µm. In such embodiments, a first optical interference layer 112 of silica having a thickness between about 85 and 115 nm, and typically about 110 nm, and a second optical interference layer 122 of titania having a thickness between about 45 nm and 125 nm, and typically about 60 nm, has provided significantly enhanced coefficient of retroreflection (Ra) when the retroreflective elements are partially embedded as a monolayer in acrylate adhesive.

Reflection of light at an interface between materials is dependent on the difference in the refractive indexes of the two materials. Materials for the cores and the optical interference layers may be selected from any of a variety of materials, as described herein. The selected materials may comprise either high or low refractive index materials, as long as sufficient differences in refractive indexes are maintained between that of the core 110 and first optical interference layer 112, between the first optical interference layer 112 and second optical interference layer 122, and between the second optical interference layer 122 and the background medium against which the retroreflective element 100 is intended to be placed, and as long as the core provides the desired refraction. Each of these differences should be at least about 0.1. In some embodiments, each of the differences between the adjacent layers should be at least about 0.2. In other embodiments, the differences are at least about 0.3, and in still other embodiments, the differences are at least about 0.5. The refractive index of optical interference layer 112 may be either greater than or less than the refractive index of core 110. In some embodiments, the choice of refractive index, and the corresponding choice of materials used, will be determined by the choice of the medium that contacts the exterior surface of the retroreflective element 100 to form third interface 124.

The refractive indexes of core 110, first optical interference layer 112, second optical interference layer 122, the medium against which the back side of retroreflective element 100 is intended to be placed, and the medium that contacts the front side of the retroreflective element are desirably selected to control the focal power of the retroreflective element as well as the strength of reflections from interfaces 116, 126 and 124.

Completely concentrically coated retroreflective elements with a front surface surrounded by air and a rear surface surrounded by a medium having a refractive index of about 1.55, such as a polymer binder) and illuminated with white light, the photopically weighted net intensity of reflected light, to the extent that it is determined by the sequence of transmission and reflection events for exactly antiparallel rays of retroreflected light as they enter and leave the retroreflective element, can vary dramatically with coating thickness or thicknesses. The term "photopically weighted net intensity of reflected light" refers to the relative fraction of white light intensity, weighted by the luminosity function, that remains after incident light on a retroreflective element is partially transmitted into the retroreflective element, partially reflected at the back of the retroreflective element, and partially transmitted upon leaving the retroreflective element antiparallel to the incident light direction, accounting only for losses of intensity that result from interfacial reflections and interference effects. When a thin single interference layer of a given material is chosen resulting in a certain index difference at each of the two reflecting interfaces (for example, silica on a 1.93 RI bead core), the photopically weighted net intensity of reflected light can vary by a factor of at least six depending on the thickness of the coating. The photopically weighted net intensity of reflected light produced by the three interfaces established by two coating layers (for example, of amorphous silica and titania on a 1.93 refractive index bead core) can vary by a factor of at least 12, depending on the exact thickness of the two concentric coatings. For some choices of coatings and thicknesses, the photopically weighted net intensity of reflected light can be reduced versus a retroreflective element in the form of an uncoated core.

In some embodiments, the core 110 may be selected to have an index of refraction suitable for use when the entry medium (that is, the medium adjacent the front surfaces of the retroreflective elements) is air. In some embodiments, when the entry medium is air, the index of refraction of the core 110 is between about 1.5 and 2.1. In other embodiments, the index of refraction of the core is between about 1.7 and about 2.0. In other embodiments, the index of refraction of the core is between 1.8 and 1.95. In still other embodiments, the index of refraction of the core is between 1.9 and 1.94. Upon selection of a suitable core 110, the core may then be first coated with lower refractive index material (e.g., 1.4-1.7) to form first optical interference layer 112, followed by coating with a high refractive index material (e.g., 2.0-2.6) to form the second optical interference layer 122. The retroreflective element 100 may be used as a component in a reflective article by affixing the retroreflective element to a substrate or backing. In such a construction, second optical interference layer 122 is affixed to the substrate by, for example, a polymeric binder or adhesive. In some embodiments, an auxiliary reflector may be included in the construction of the article.

In some embodiments, the retroreflective elements 100 are used in articles having high retroreflectivity in an exposed-lens construction under wet conditions. In such embodiments, the core 110 of the retroreflective element 100 has an index of refraction typically between about 2.0 and about 2.6. In other embodiments, the index of refraction of the core is between 2.3 and 2.6. In still other embodiments, the index of refraction of the core is between 2.4 and 2.55. The core 110 is first coated with a lower refractive index material (e.g., 1.4-1.9) to form the first optical interference layer 112, and then coated with a higher refractive index material (e.g., 2.0-2.6) to provide a second optical interference layer 122. The resulting retroreflective element 100 may be used as a component of a reflective article with the retroreflective element 100 affixed to a substrate or backing. In such a construction, the retroreflective element is affixed to the substrate with second optical interference layer 122 embedded, for example, in a polymeric binder, backing material or adhesive. In some embodiments, the binder itself may be pigmented with diffuse-scattering or specular pigment that enhances the retroreflectivity of the article.

Figure 2:
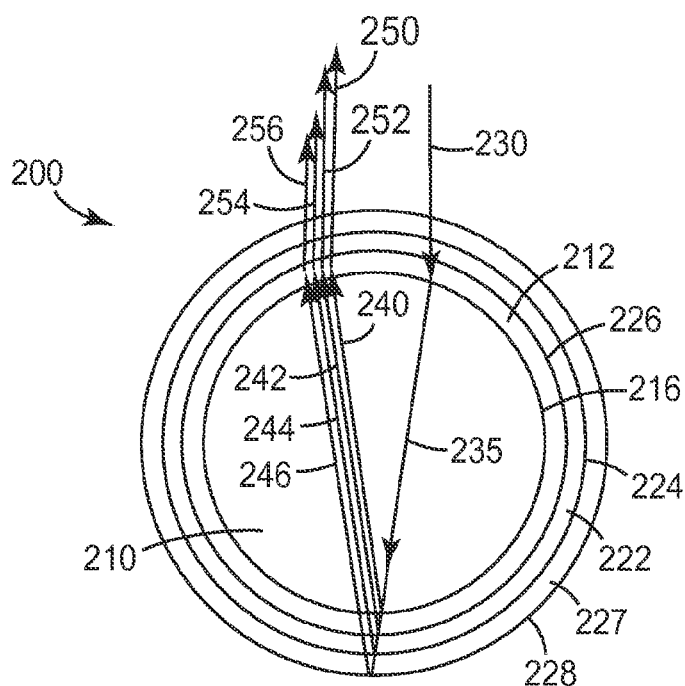
FIG. 2 is a cross-sectional view of another embodiment of a retroreflective element according to the invention.

In other embodiments, retroreflective elements comprising more than two complete concentric optical interference layers are provided. Referring to FIG. 2, another embodiment of a retroreflective element in the form of a retroreflective element is shown and will now be described. The retroreflective element 200 includes a transparent substantially spherical core 210 having thereon a first optical interference layer 212. Core 210 contacts first optical interference layer 212 at first interface 216. Second concentric optical interference layer 222 overlies the first concentric optical interference layer 212. Layer 222 has an interior surface that contacts the exterior or outermost surface of first layer 212, forming a second interface 226. The retroreflective element 200 also includes a third optical interference layer 227 which contacts the outermost surface of the second optical interference layer 222 at third interface 224. The third optical interference layer includes an exterior surface which forms the outermost surface of the retroreflective element 200 and forms a fourth interface 228. The first, second and third optical interference layers 212, 222 and 227 are substantially uniform in thickness and concentric with the spherical core 210.

Light is reflected at the interfaces between the materials used in the retroreflective element 200, provided that the different materials have sufficiently different refractive indexes (e.g., having a difference in refractive indexes of at least about 0.1). A sufficient difference in the refractive indexes of the core 210 and first optical interference layer 212 gives rise to a first reflection at first interface 216. Similarly, a sufficient difference in the refractive indexes of first optical interference layer 212 and second optical interference layer 222 gives rise to a second reflection at second interface 226. A sufficient difference in the refractive indexes of second optical interference layer 222 and third optical interference layer 227 gives rise to a third reflection at third interface 224. A sufficient difference in the refractive indexes of third optical interference layer 227 and any background medium (e.g., vacuum, gas, liquid, solid) contacting third optical interference layer 227 gives rise to a fourth reflection at fourth interface 228 of the retroreflective element 200. Selection of the thicknesses and refractive indexes of the optical interference layers 212, 222 and 227 results in reflections and interference effects that provide a retroreflected light that enhances the visibility of an article that includes the retroreflective element 200 as a part thereof. In some embodiments, under white light illumination, the four reflections may destructively interfere with each other for certain wavelengths, resulting in retrochromism wherein the retroreflected light is of a different color from that which would otherwise be observed in the absence of such interference.

Referring again to FIG. 2, an incident beam of light 230 is shown as being directed at retroreflective element 200. Light 230 is shown as being largely transmitted through third optical interference layer 227, second optical interference layer 222 and first optical interference layer 212 before it enters core 210. However, portions of the incident light 230 may be reflected at fourth interface 228, at third interface 224, at second interface 226 or at first interface 216. The portion of the light 230 that enters core 210, is focused by refraction onto the opposite side of the core 210. The refracted light 235 encounters first interface 216 at the back of core 210, some of refracted light 235 is reflected back as reflected light 240 towards the front of the retroreflective element 200 where it ultimately emerges from the retroreflective element as retroreflected light 250 in a direction that is substantially antiparallel to incident light 230. Another portion of the focused light passes through optical interference layer 212 and is reflected back at second interface 226 as reflected light 242. Reflected light 242 emerges from the retroreflective element as retroreflected light 252 which travels in a direction that is substantially anti-parallel to incident light 230. Still another portion of the focused light passes through first and second optical interference layers 212 and 222 and is reflected back at third interface 224 as reflected light 244 which ultimately emerges from the retroreflective element 200 as retroreflected light 254. Still another portion of the focused light passes through first, second and third optical interference layers 212, 222 and 227 and is reflected back at fourth interface 228 as reflected light 246 which ultimately emerges from the retroreflective element 200 as retroreflected light 256. The exterior surface of optical interference layer 227 forms a fourth interface 228 with the medium in which the retroreflective element 200 is disposed (e.g., gas, liquid, solid, or vacuum). A portion of incident light is not reflected but passes entirely through the retroreflective element 200.

Interference between reflected light 240, 242, 244, 246 and in turn retroreflected light 250, 252, 254, 256 may give rise to a change in color of the retroreflected light, with respect to the incident light (for example incident white light). For example, subtraction of wavelengths from the center of the spectrum of incident white light results in retroreflected light with a red-violet hue (i.e., retrochromism). Slightly thicker optical interference layers subtract longer wavelengths, resulting in, for example, green or blue-green hues. When incorporated in an article, a plurality of retroreflective elements 200 can provide retrochromic properties that enhance the appearance of the article by providing a covert color, design, message or the like. A retrochromic effect can be obtained by manufacturing the retroreflective element 200 with optical interference layers 212, 222 and 227 of different materials and by selecting the thicknesses and refractive indexes of those materials so that the aforementioned retroreflected light 250, 252, 254, 256 destructively interfere with each other. As a result, the retroreflective element 200, when viewed in a retroreflective mode, provides retroreflected light of a different color from that which would otherwise be observed in the absence destructive interference.

In other embodiments, the proper selection of materials, thicknesses and refractive indexes for the optical interference layers 212, 222, 227, retroreflective element 200 can provide retroreflected light 250, 252, 254, 256 that is brighter (e.g., has a higher coefficient of retroreflection (Ra)) than retroreflected light from uncoated retroreflective elements, for example. When incorporated in an article, a plurality of retroreflective elements 200 provide retroreflective properties that enhance the visibility of the article. Constructive interference between reflected light 240, 242, 244, 246 and in turn retroreflected light 250, 252, 254, 256 gives rise to unexpected increases in the brightness or intensity of the retroreflected light. In some embodiments, coating thicknesses for the three optical interference layers can be optimized to provide maximum retroreflectivity when the layers are alternating layers of silica/titania/silica and the core comprises a glass bead having a diameter of measuring from about 30 μm to about 90 μm and index of refraction of approximately 1.93. In such embodiments, a first optical interference layer 212 of silica having a thickness between about 95 nm and 120 nm, and typically about 110 nm, a second optical interference layer 222 of titania having a thickness between about 45 nm and 80 nm and typically about 60 nm, and a third optical interference layer 227 of silica having a thickness between about 70 nm and 115 nm, and typically about 100 nm, has provided significantly enhanced coefficient of retroreflection (Ra) when the retroreflective elements are partially embedded as a monolayer in acrylate adhesive.

Reflection at an interface between materials is dependent on the difference in the refractive indexes of the two materials. Materials for the cores and the optical interference layers may be selected from any of a variety of materials, as described herein. The selected materials may comprise either high or low refractive index materials, as long as a sufficient difference in the refractive indexes is maintained between adjacent materials (e.g., core/layer 212; layer 212/layer 222; layer 222/layer 227) and as long as the core provides the desired refraction. The difference in refractive indexes of core 210 and first optical interference layer 212, and the difference in refractive indexes of first optical interference layer 212 and second optical interference layer 222, and the difference between the refractive indexes of second optical interference layer 222 and third optical interference layer 227, and the difference between the refractive indexes of third optical interference layer 227 and the medium against which the back side of retroreflective element 200 is intended to be placed should each be at least about 0.1. In some embodiments, each of the differences between the adjacent layers is at least about 0.2. In other embodiments, the differences are at least about 0.3, and in still other embodiments, the differences are at least about 0.5. The refractive index of optical interference layer 212 may be either greater than or less than the refractive index of core 210. In some embodiments, the choice of refractive index, and the corresponding choice of materials used, will be determined by the choice of the medium that contacts the exterior surface of the retroreflective element 200 to form third interface 224 where reflection is intended to occur.

As described above, for completely concentrically coated retroreflective elements with a front surface surrounded by air and a rear surface surrounded by (e.g., embedded in) a medium having a refractive index of about 1.55, such as a polymer binder, and illuminated with white light, the photopically weighted net intensity of reflected light, to the extent that it is determined by the sequence of transmission and reflection events for exactly antiparallel rays of retroreflected light as they enter and leave the retroreflective element, can vary dramatically with coating thickness or thicknesses, for a given desirable set of coating materials and refractive index values. The photopically weighted net intensity of reflected light produced by the four interfaces established by three coating layers (for example, of amorphous silica, followed by amorphous titania, followed by amorphous silica, on a 1.93 refractive index bead core) can vary by a factor of at least four. For some choices of coatings and thicknesses, the photopically weighted net intensity of reflected light can be significantly reduced versus a retroreflective element in the form of an uncoated bead.

Suitable materials to use as coatings for the foregoing optical interference layers include inorganic materials that provide transparent coatings. Such coatings tend to make bright, highly retroreflective articles. Included within the foregoing inorganic materials are inorganic oxides such as $TiO_2$ (refractive index of 2.2-2.7) and $SiO_2$ (refractive index of 1.4-1.5) and inorganic sulfides such as ZnS (refractive index of 2.2). The foregoing materials can be applied using any of a variety of techniques. Other suitable materials having a relatively high refractive index include CdS, $CeO_2$, $ZrO_2$, $Bi_2O_3$, ZnSe, $WO_3$, PbO, ZnO, $Ta_2O_5$, and others known to those skilled in the art. Other low refractive index materials suitable for use in the present invention include $Al_2O_3$, $B_2O_3$, $AlF_3$, MgO, $CaF_2$, $CeF_3$, LiF, $MgF_2$ and $Na_3AlF_6$.

Where the coated retroreflective elements of the invention are to be used in an environment where water insolubility is not needed, other materials may be used such as, for example, sodium chloride (NaCl). Additionally, it is within the scope of the invention to concentrically coat the bead cores with multiple layers wherein at least one of the layers is an organic coating. In some embodiments, the use of one or more organic coatings is preferred when the organic coating, and other coatings supported on it, are to be preferentially removed from the front surface of the coated retroreflective elements. The selective removal of front surface coatings might be desired to provide a coating design with high reflectivity for its collection of interfaces when intact and adjacent to a background polymeric binder, but to lower reflectivity for the front-face when the those front-face coatings were removed.

In some embodiments, portions of one or more of the optical interference layers can be removed to expose underlying optical interference layer(s) or to expose at least a portion of the core. Removal of portions of one or more optical interference layer(s) can occur during the initial manufacture of the retroreflective elements, prior to release of a product into the field or at a later time after product comprising the retroreflective elements has already been released and applied in an end use (e.g., removal by wear).

In some embodiments, the retroreflective elements 200 are used in articles having high retroreflectivity in an exposed-lens construction under dry conditions. In such embodiments, the core 210 of the retroreflective element 200 has an index of refraction typically between about 1.5 and about 2.1. Typically, when the entry medium is air, the index of refraction of the core 210 is between about 1.5 and 2.1. In other embodiments, the index of refraction of the core 210 is between about 1.7 and about 2.0. In other embodiments, the index of refraction of the core 210 is between 1.8 and 1.95. In other embodiments, the index of refraction of the core 210 is between 1.9 and 1.94.

In order to obtain a desired level of retroreflectivity, the core 210 may be selected to have a relatively high index of refraction. In some embodiments, the index of refraction of the core is greater than about 1.5. In other embodiments, the index of refraction of the core is between about 1.55 and about 2.0. In some embodiments, the core 210 may be first coated with low refractive index material (e.g., 1.4-1.7) to form first optical interference layer 212, followed by coating with a high refractive index material (e.g., 2.0-2.6) to form the second optical interference layer 222. Thereafter, the third optical interference layer 227 may be coated over the second optical interference layer using a low refractive index material (e.g., 1.4-1.7). The retroreflective element 200 may be used as a component in a reflective article by affixing the retroreflective element to a substrate or backing. In such a construction, third optical interference layer 227 is affixed to the substrate by, for example, a polymeric adhesive or binder. In some embodiments of the aforementioned articles, the binder itself may be pigmented with diffuse-scattering or specular pigment that enhances the reflective properties and the retroreflectivity of the article.

In other embodiments, the core 210 is first coated with high refractive index material (e.g., 2.0-2.6) to form the first optical interference layer 212, and then coated with a low refractive index material (e.g., 1.4-1.7) to provide a second optical interference layer 222. Thereafter, the third optical interference layer 227 may be coated over the second optical interference layer using a high refractive index material (e.g., 2.0-2.6). The resulting retroreflective element 200 may be used as a component of a reflective article with the retroreflective element 200 affixed to a substrate or backing. In such a construction, the retroreflective element is affixed to the substrate with third optical interference layer 227 embedded, for example, in a polymeric binder. In some embodiments, the binder itself may be pigmented with diffuse-scattering or specular pigment that enhances the retroreflectivity of the article.

Articles comprising the retroreflective elements described herein can be made to provide patterns when viewed in a retroreflective mode. As used herein, a "pattern" is defined by and composed of a plurality of regions. In some embodiments of the invention, the coated retroreflective elements are arranged in regions which are each discernible if viewed in both retroreflective and other modes. Retrochromic patterns can comprise one or more retrochromic regions that are discernible only when viewed in retroreflective mode. Such retrochromic patterns are referred to as being "covert" patterns.

Retroreflective patterns, including those that are retrochromic, may be of any size and/or shape (e.g., substantially one, two, or three dimensional) and may be provided in geometric shapes such as, for example, circle(s), line(s) (e.g., wavy, straight or curved), polygon(s) (e.g., triangle(s), square(s), rectangle(s)), polyhedron(s) (e.g., cube, tetrahedron, pyramid, sphere), or other indicia such as one or more alphanumeric character(s) (e.g., letter(s), number(s), trademark(s), logo(s), official seal(s)), and/or graphics. In some embodiments, retroreflective and/or retrochromic patterns are provided that are microscopic in size in that the patterns require magnification or other viewing aids to discern them. Larger retroreflective and/or retrochromic patterns are also useful, and it is within the scope of the present invention to provide microscopic retroreflective and/or retrochromic patterns within larger retroreflective and/or retrochromic patterns.

Retroreflective and/or retrochromic patterns are formed utilizing the coated retroreflective elements described herein, and optionally including other retroreflective and/or retrochromic retroreflective elements such as, for example, those described in U.S. Pat. No. 7,036,944 (Budd et al.); and/or with retroreflective non-retrochromic retroreflective elements as described in, for example, U.S. Pat. No. 2,326,634 (Gebhard et al.), and U.S. Pat. No. 5,620,775 (LaPerre), the entire disclosures of which are incorporated herein by reference thereto.

When the retroreflective elements of the invention are incorporated into an article, the construction of the retroreflective elements can influence whether the article is highly retroreflective as well as whether the article, when viewed in the retroreflective mode, also exhibits covert color. For retroreflective elements coated with silica and/or titania, coating thicknesses of the metal oxide layers can influence the retroreflective characteristics of the finished article. For example, retroreflective elements comprising two complete concentric optical interference layers coated on a 1.9 RI glass core with the first optical interference layer being silica of a thickness of about 110 nm and the second optical interference layer being titania, can produce significant covert color when the second optical interference layer of titania is at a coated thickness within the range from 100 nm to 215 nm. Where the titania layer is less than 100 nm, little or no color is observed. These observations apply whether the retroreflective elements are adhered to a polymer backing or whether they are observed in a glass vial with "air" adjacent the entire retroreflective element outer surface. Retroreflective elements comprising three complete concentric optical interference layers coated on a 1.9 RI glass core with the first optical interference layer being silica of a thickness of about 110 nm and the second optical interference layer being titania of a thickness of about 60 nm, and the third optical interference layer being silica can produce significant covert color when the third optical interference layer of silica is coated to have a thickness within the range from 50 nm to 75 nm as well as from 95 nm to 120 nm when the retroreflective elements are observed in a glass vial. Little or no color is observed for coating thicknesses within the rage from 0-50 or 75-95 nm. When the retroreflective elements are adhered to a polymer backing, color is observed for retroreflective elements having a third optical interference layer of silica at within the range from 30 nm to 120 nm.

Retroreflective elements having complete concentric optical interference layers of silica, titania, and silica that exhibit a retroreflected color and are retrochromic can exhibit one retroreflected color when the back of the retroreflective element is surrounded by air and a different retroreflected color when the back of the retroreflective element is embedded in a polymer. A color shifting retroreflective article can comprise retroreflective elements that are partially sunken into a polymer layer or substrate. In such embodiments, if the retroreflective elements comprise sufficient exposed area, the focal region for incident light can be configured by the viewer to be near an area on the surface of the element that is embedded in the polymer, or to be near an area of the surface of the retroreflective element that is above (e.g., not sunken into) the polymer layer or substrate by, for example, tilting the article. The retroreflected color associated with a polymer encased rear surface will be exhibited for a range of illumination incidence angles ranging from normal to the surface (i.e., zero degrees) to some critical angle. The retroreflected color associated with an air encased rear surface will be exhibited for illumination incidence angles greater than the critical angle as measured from the normal to the surface (i.e., 90 degrees would correspond to incident light parallel to the surface). It will be appreciated that other materials and constructions of retroreflective elements and articles comprising such retroreflective elements will also provide retroreflective color or enhanced retroreflective brightness in addition to the foregoing constructions. All such embodiments are considered within the scope of the invention.

Figure 3:
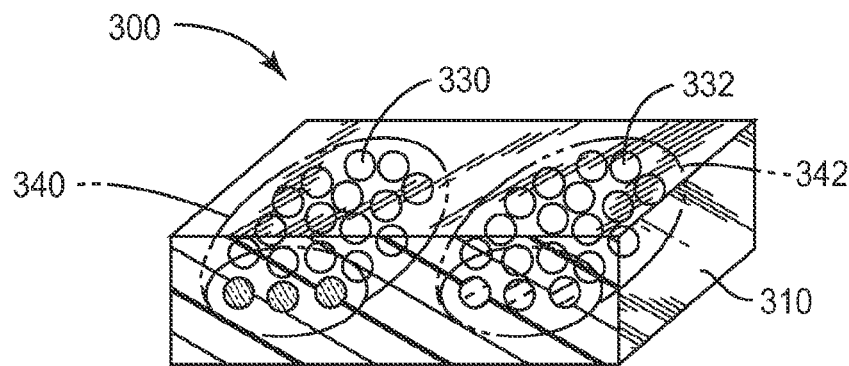
FIG. 3 is a cross-sectional isometric view of an exemplary embodiment of retroreflective article according to the present invention.

In some embodiments of the present invention, at least one viewable region may be contained in one or more interior cavities of a substrate. Referring to FIG. 3, an article 300 is depicted which comprises substrate 310 having two viewable interior regions 340 and 342. Interior region 340 contains retroreflective elements 330. In some embodiments, the retroreflective elements 330 exhibit a first retroreflective brightness or color. Interior region 342 contains other retroreflective elements 332 that, in some embodiments, exhibit a second retroreflective brightness or color. In some embodiments, one region (e.g., region 340) may exhibit a first color in a retrochromic effect, as described herein, while the other region (e.g., region 342) exhibits enhanced retroreflective brightness. In other embodiments, both of the regions 340 and 342 exhibit enhanced retroflective brightness. In still other embodiments, retroreflective elements 330 and retroreflective elements 332 are a mixture of retroreflective elements with different constructions so that a portion of the retroreflective elements in each of the regions 340 and 342 exhibit enhanced retroreflection while a portion of the retroreflective elements in each regions provide retroreflective color. Other variations will be apparent to those skilled in the art. Moreover, it will be understood that the two regions 340 and 342 are intended to be exemplary, and the present invention is not limited in any manner by the number of retroreflective regions in an article.

Figure 4:
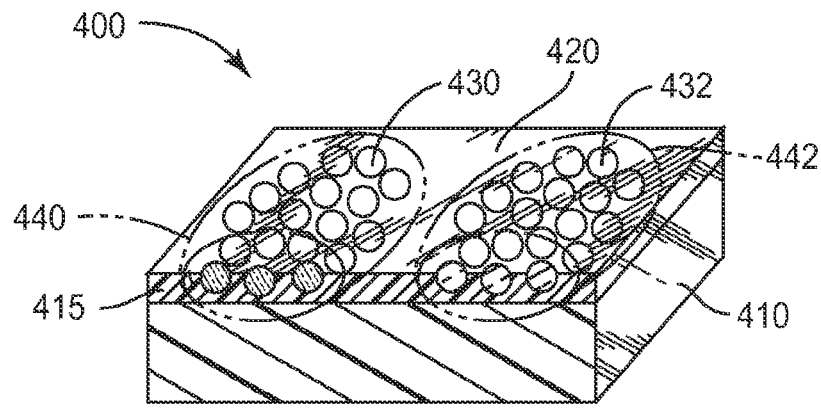
FIG. 4 is a cross-sectional isometric view of another exemplary embodiment of retroreflective article according to the present invention.

In some embodiments of the present invention, one or more viewable retroreflective regions are combined in an article to form a retroreflective layer. The retroreflective layer may be affixed to a surface of a substrate, either as, for example, a layer of retroreflective elements that have been partially embedded (e.g., by heat and/or pressure) into the surface of the substrate, or as, for example, a coating comprising retroreflective elements and a binder material. An exemplary embodiment is shown in FIG. 4 wherein article 400 includes substrate 410, and retroreflective layer 415 having viewable regions 440 and 442. Retroreflective layer 415 comprises retroreflective elements 430 and 432 affixed within binder 420 with viewable regions 440 and 442. In some embodiments, the regions 440 and 442 are retrochromic and exhibit first and second retroreflective colors, respectively. In some embodiments, one region (e.g., region 440) may exhibit a first color in a retrochromic effect, as described herein, while the other region (e.g., region 442) exhibits enhanced retroreflective brightness. In other embodiments, both of the regions 440 and 442 exhibit enhanced retroflective brightness. In still other embodiments, retroreflective elements 430 and retroreflective elements 432 are a mixture of elements with different constructions so that a portion of the retroreflective elements in each of the regions 440 and 442 exhibit enhanced retroreflective brightness while a portion of the retroreflective elements in each region provide retroreflective color.

Figure 5:
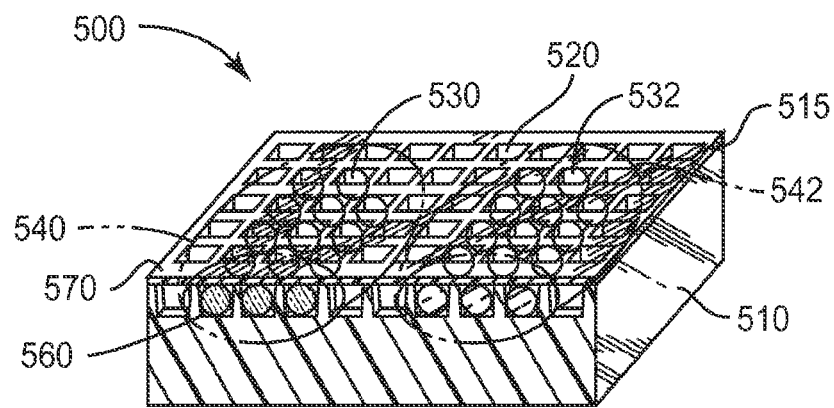
FIG. 5 is a cross-sectional isometric view of still another exemplary embodiment of retroreflective article according to the present invention.

Referring to FIG. 5, article 500 includes substrate 510 having a topographical surface 515 with two viewable regions 540 and 542, and having an array of wells 520. Some of wells 520 contain retroreflective and/or retrochromic coated retroreflective elements 530 and 532. Wells 520 may optionally contain a liquid 560. An optional cover layer 570 is affixed to the edges of the wells. The cover layer 570 may be constructed to provide a hermetic seal.

Topographical features may be included in articles that incorporate coated retroreflective elements of the present invention. Topographical features may have a height of at least about 50 micrometers and less than about 5 centimeters. Topographical features include, for example, pyramids, posts, ridges, channels, grooves, wells (e.g., a hemispherical depression or truncated square pyramidal depression), and/or combinations of two or more of the foregoing. A plurality of topographical features may form a repeating pattern or a randomly arranged pattern. For repeating patterns, the center-center distance of like integral topographical features, in some embodiments, is in the range of from about 0.1 millimeters to about 1 cm. Other center-center distances may be employed as well. Topographical features may be made by any of a variety of techniques. For thermoplastic substrates, for example, the substrate may be formed by injection molding, or embossing as described, for example, in PCT Publication No. WO 99/55537 A1 (Ylitalo et al.), the disclosure of which is incorporated herein by reference.

In some embodiments, the substrate surface may comprise a plurality or an array of topographical features defining a plurality of cavities, each cavity dimensioned to retain at least one coated retroreflective element therein. A cover layer may be applied over the cavities and to the substrate using an adhesive (e.g., pressure-sensitive adhesive, hot melt) and/or by lamination. In some embodiments, the enclosed cavities may also contain a liquid such as oil (e.g., mineral oil), water, another solvent or the like.

In some embodiments of the invention, the retroreflective elements of the invention provide a retrochromic pattern having at least one identifying mark. Exemplary identifying marks include trademarks, brand names, a manufacturer's name, a government seal or the like.

Retroreflective articles that include the retroreflective elements described herein in the form of security laminates and documents may be affixed to any item. Security articles include items of legal, governmental, and/or financial importance. Exemplary security articles include validation stickers for vehicle license plates, security films for drivers' licenses, title documents (e.g., to a home or car), stock certificates, financial instruments (e.g., a loan contract), certain types of tickets (e.g., an airline ticket or a lottery ticket), checks, reports, financial cards (e.g., credit card or a debit card), identity cards, currency, passports, and the like. Laminate articles including the retroreflective elements of the present invention may be affixed to other items such as tamper-indicating seals for reclosable containers (e.g., liquor bottles, medication bottles). In some embodiments, similar but retroreflectively contrasting retroreflective elements can be arranged in a pattern embedded in a transparent bead-bond to provide a laminate with a contrasting covert color as a security feature.

In some embodiments, a printing process may be used in which the retroreflective elements are mixed in a colored ink and the retroreflective element/ink mixture is laid down (e.g., printed) as an image or pattern. In some embodiments, the ink is provided in a different color than the color(s) provided by the retroreflective elements to achieve a distinctive look when alternating between ambient light and retroreflective lighting. In other embodiments, a colored ink can be selected to have a color similar or identical to the covert color(s) provided by the coated retroreflective elements of the invention to produce a document in which the color of the ink background is enhanced significantly when the article is viewed in the retroreflective mode. In other embodiments, inks containing retroreflective elements providing differing levels of enhanced retroreflective brightness can be used to create patterns having regions of differing retroreflective brightness.

In the manufacture of a retroreflective article, retroreflective elements may be coated along a first major surface of a substrate, while the opposite side or second major surface of the substrate is kept retroreflective element-free. Proper adhesion of the retroreflective elements to the substrate may require that the retroreflective elements be at least partially sunken in a binder or semi-molten backing material (e.g., a polymeric film) to a depth between about 20% and about 70% of the diameter of the coated retroreflective element. In some embodiments, the retroreflective elements are sunken to a depth of between about 30% and about 60% of the retroreflective element diameter. The coated retroreflective elements may be sunken into the adhesive or substrate by compressing the retroreflective element/substrate composite between two rollers at an elevated temperature. Polymeric films suitable as substrates include without limitation modified polyethylene (PE) materials such as ethylene vinyl acetate (EVA) or ethylene acrylic acid (EAA) copolymers or maleic-anhydride grafted polymers. Suitable EVA materials are commercially available such as those available under the trade designation "Fusabond" from E. I. du Pont de Nemours and Company, and in particular, the material designated as Fusabond MC190D. Suitable EAA copolymers are commercially available such as the copolymers available under the trade designation "Primacor" from the Dow Chemical Company and particulary those available under the designation Primacor 3340. In some embodiments, polymeric substrates (e.g., EVA or EAA copolymer) may be provided as extruded films manufacture using a cast film extrusion process, for example.

In some embodiments, the interface between the substrate and the coated retroreflective element (the "bead-bond") may be modified by treating the retroreflective elements or the substrate with a coupling agent such as a silane coupling agent, for example. In such embodiments, the silane moieties will bond with the polymeric substrate and/or the coated retroreflective elements described herein. Silane moieties are more likely to bond with certain substrates such as an acid-modified polyethylene like that commercially available from DuPont under the trade designation "Bynel 3126." A suitable silane coupling agent is gamma-aminopropyltriethoxy silane, commercially available through OSi Specialties as "Silquest® A1100." The use of silane coupling agent may increase the friction between the retroreflective elements during the printing and flood-coating steps. Therefore, it may be necessary to include a flow aide to the retroreflective elements. Examples of suitable particulate flow aides include Cabosil TS530, HiSili 233, and Flo-gard FF L-26-0.

In some embodiments, the substrate is a cross-linked polymer with improved resistance to chemical, mechanical or thermal degradation. The document side of the polymer substrate can be adhesively laminated to the security document. Cross-linking of the substrate may be accomplished in a known manner such as by radiation curing. In some embodiments, the curing reaction can be limited to the retroreflective element-coated side of the substrate so that that the retroreflective element side is more heavily cross-linked than the document side. Other techniques include the use of a cross-linking agent added to the retroreflective element-side of the substrate in a gradient so that the retroreflective element-side contains more of the agent than the non-retroreflective element side. Subsequent application of a curing technique facilitates the crosslinking of the substrate with more extensive crosslinking on retroreflective element-side. In other embodiments, a thin bead-bond layer (e.g., coated retroreflective elements bonded to an adhesive layer) is cross-linked in its entirety and subsequently laminated to a substrate of similar chemistry but with substantially less cross-linking. In some embodiments, a security article comprising retroreflective elements may be provided with a "floating image" like that described in U.S. Pat. No. 6,288,842 (Florczak et al.), the entire disclosure of which is incorporated herein by reference.

A protective coating may be applied over the retroreflective elements embedded in the substrate to protect the substrate from grime, dirt, and weathering. Suitable protective materials are commercially available such as those available under the trade designation "Scotchgard" from 3M Company of St. Paul, Minn.

Retroreflective elements of the invention can also be used in any of a variety of articles that can utilize the retroreflective features of the retroreflective elements described herein. In some embodiments, the retroreflective elements may be incorporated into security articles. In other embodiments, the retroreflective elements may be utilized in the construction of pavement markings. In still other embodiments, the retroreflective elements of the invention may be used to impart high retroreflectivity in the field of apparel such as safety apparel and decorative apparel such as safety vests, running apparel, biking apparel, athletic shoes (e.g., running shoes) and the like.

In the manufacture of retroreflective elements, the coated retroreflective elements of the invention may be conveniently, and economically, prepared using a fluidized bed of transparent uncoated retroreflective elements and vapor deposition processes (e.g., processes for depositing vapor phase materials onto a fluidized (i.e., agitated) bed of transparent retroreflective elements. In some embodiments, vapor phase precursor materials are mixed in proximity to the transparent retroreflective elements and chemically react in situ to deposit a layer of material on the respective surfaces of the retroreflective elements. In other embodiments, material is presented in vapor form and deposits as a layer on the respective surfaces of the transparent retroreflective elements with essentially no chemical reaction.

Depending upon the deposition process being used, precursor material(s) (in the case of a reaction-based deposition process) or layer material(s) (in the case of a non-reaction-based process), typically in vapor phase, is or are placed in a reactor with transparent retroreflective elements. Embodiments of the present invention utilize a vapor phase hydrolysis reaction to deposit a concentric optical interference layer (e.g., a layer of metal oxide) onto the surface of a core. The foregoing process is referred to as a chemical vapor deposition ("CVD") reaction.

In some embodiments, a low temperature, atmospheric pressure chemical vapor deposition ("APCVD") process is used. Such processes do not require vacuum systems and can provide high coating rates. Hydrolysis-based APCVD (i.e., APCVD wherein water reacts with a reactive precursor) is most desired because of the ability to obtain highly uniform layers at low temperatures, e.g., typically well below 300° C.

An illustrative vapor phase hydrolysis-based reaction is as follows:

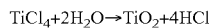

$$TiCl_4 + 2H_2O \rightarrow TiO_2 + 4HCl$$

In the reaction, water vapor and titanium tetrachloride, taken together, are considered metal oxide precursor materials.

Useful fluidized bed vapor deposition techniques are described, for example, in U.S. Pat. No. 5,673,148 (Morris et al.), the disclosure of which is incorporated herein by reference. A well-fluidized bed can ensure that uniform layers are formed both for a given particle and for the entire population of particles. In order to form substantially continuous layers covering essentially the entire surfaces of the cores, the cores are suspended in a fluidized bed reactor. Fluidizing typically tends to effectively prevent agglomeration of the cores, achieve uniform mixing of cores and reaction precursor materials, and provide more uniform reaction conditions, thereby resulting in highly uniform concentric optical interference layers. By agitating the cores, essentially the entire surface of each assembly is exposed during the deposition, and the assembly and reaction precursors or layer material may be well intermixed, so that substantially uniform and complete coating of each retroreflective element is achieved.

If the cores show a tendency to agglomerate, they may be coated with fluidizing aids, e.g., small amounts of fumed silica, precipitated silica, methacrylato chromic chloride having the trade designation "VOLAN" (available from Zaclon, Inc., Cleveland, Ohio).

One technique for getting precursor materials into the vapor phase and adding them to the reactor is to bubble a stream of gas, desirably a non-reactive gas, referred to herein as a carrier gas, through a solution or neat liquid of the precursor material and then into the reactor. Exemplary carrier gases include argon, nitrogen, oxygen, and/or dry air. Optimum flow rates for carrier gas(es) used in a particular application depend, in part, on the temperature within the reactor, the temperature of the precursor streams, the degree of assembly agitation within the reactor, and the particular precursors being used. Useful flow rates may be determined by routine optimization techniques. Desirably, the flow rate of carrier gas used to transport the precursor materials to the reactor is sufficient to both agitate the transparent retroreflective elements and transport optimal quantities of precursor materials to the reactor.

Figure 6:
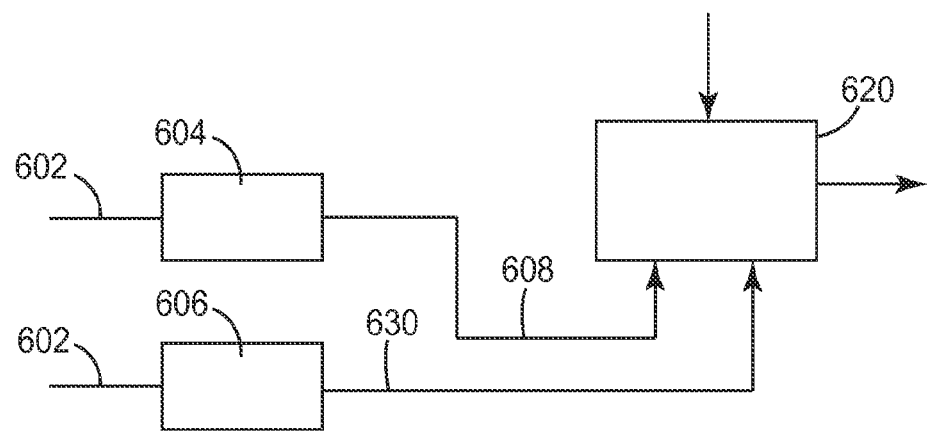
FIG. 6 is a schematic diagram of a process for making retroreflective elements according to the present invention.

Referring to FIG. 6, an exemplary process for making retroreflective elements is shown, carrier gas 602 is bubbled through water bubbler 604, to produce water vapor-containing precursor stream 608. Carrier gas 602 is also bubbled through titanium tetrachloride bubbler 606, to produce titanium tetrachloride-containing precursor stream 630. Precursor streams 608 and 630 are then transported into heated reactor 620. Uncoated beads or cores are introduced into reactor 620 where the cores attain a coating of titanium oxide. The thickness of the coating may be controlled by monitoring the retrochromic color of the developing retroreflective elements in the reactor 620. For example, a retrochromic color of bright purple indicates a coating thickness of about 80 nm. The progress of layer deposition may be monitored by viewing the retroreflective elements in retroreflective mode, for example, by using a retroviewer (e.g., as described in U.S. Pat. No. 3,767,291 (Johnson) and U.S. Pat. No. 3,832,038 (Johnson), the disclosures of which are incorporated herein by reference) either in situ using a glass-walled reactor or by removal of retroreflective elements from the reactor. Retroviewers useful for viewing intrinsically retrochromic retroreflective elements and articles containing them are also commercially available, for example, under the trade designation "3M VIEWER" from 3M Company, St. Paul, Minn.

The aforementioned process may be repeated to deposit additional coated layers onto the cores, typically changing the reactant used for each layer. For example, a titanium oxide-coated retroreflective element may subsequently receive a coating of silicon oxide by using silicon tetrachloride and water as coating precursors. Adjustments in the process parameters for each of the coatings may be desired and is within the skill of those practicing in the field. Typically, precursor flow rates are adjusted to provide an adequate deposition rate and to provide a metal oxide layer of desired quality and character. Desirably, flow rates are adjusted such that the ratios of precursor materials present in the reactor chamber promote metal oxide deposition at the surface of the bead cores with minimal formation of discrete, i.e., free floating, metal oxide particles, elsewhere in the chamber. For example, if depositing layers of titania from titanium tetrachloride and water, a ratio of between about eight water molecules per each titanium tetrachloride molecule to one water molecule per two titanium tetrachloride molecule is generally suitable, with about two water molecules of water per titanium tetrachloride molecule being preferred. Under these conditions there is sufficient water to react with most of the titanium tetrachloride and most of the water is adsorbed onto the surface of the retroreflective element. Much higher ratios tend to yield substantial quantities of unabsorbed water that might result in formation of oxide particulates rather than the desired oxide layers.

Desirably, precursor materials have sufficiently high vapor pressures that sufficient quantities of precursor material will be transported to the reactor for the hydrolysis reaction and layer deposition process to proceed at a conveniently fast rate. For instance, precursor materials having relatively higher vapor pressures typically provide faster deposition rates than precursor materials having relatively lower vapor pressures, thereby enabling the use of shorter deposition times. Precursor sources may be cooled to reduce vapor pressure or heated to increase vapor pressure of the material. The latter may necessitate heating of tubing or other means used to transport the precursor material to the reactor, to prevent condensation between the source and the reactor. In many instances, precursor materials will be in the form of neat liquids at room temperature. In some instances, precursor materials may be available as sublimable solids.

Certain desirable precursor materials are capable of forming dense metal oxide coatings via hydrolysis reactions at temperatures below about 300° C., and often below about 200° C., for coating beads. In some embodiments, titanium tetrachloride and/or silicon tetrachloride, and water are used as precursor materials. In addition to volatile metal chlorides, other precursor materials include, for example, mixtures of water and at least one of: metal alkoxide(s) (e.g., titanium isopropoxide, silicon ethoxide, zirconium n-propoxide), metal alkyl(s) (e.g., trimethylaluminum, diethylzinc). It may be desirable to utilize several precursors simultaneously in a coating process. However, mutually reactive precursor materials, e.g., $TiCl_4$ and $H_2O$, are not mixed prior to being added to the reactor in order to prevent premature reaction within the transport system. Multiple gas streams into the reaction chamber are typically provided.

Vapor deposition processes include hydrolysis based CVD and/or other processes. In such processes, the retroreflective elements are typically maintained at a temperature suitable to promote effective deposition and formation of the concentric optical interference layer with desired properties on the retroreflective elements. Increasing the temperature at which the vapor deposition process is conducted typically yields a resultant concentric layer that is denser and retains fewer fugitive unreacted precursors. Sputtering or plasma-assisted chemical vapor deposition processes, if utilized, often require minimal heating of the article being coated, but typically require vacuum systems, and can be difficult to use if coating particulate materials such as small glass beads.

Typically, a deposition process that operates at a temperature low enough not to undesirably degrade the transparent beads should be selected. Deposition of an optical interference layer is achieved using a hydrolysis-based APCVD process at temperatures below about 300° C., and typically below about 200° C. Titania and titania-silica layers deposited from tetrachlorides are easily deposited by APCVD at low temperatures, e.g., between about 120° C. and about 160° C. Silica layers are often deposited at temperatures between about 20° C. and about 100° C.

A dimensionally stable substantially spherical transparent bead may be used as a core in the coated retroreflective elements of the present invention. Cores may be inorganic, polymeric or other provided that they are substantially transparent to at least one wavelength of visible light. Typically, cores have a diameter of from about 20 to about 500 micrometers. In some embodiments, the diameter ranges from about 50 to about 100 micrometers, although other diameters are possible.

In some embodiments, the core of the coated retroreflective elements are made of an inorganic glass comprising silica, having a refractive index of from about 1.5 to about 2.5 or even higher. In some embodiments, the refractive index ranges from about 1.7 to about 1.9. Cores may also have a lower refractive index value depending on the particular intended application, and the composition of the concentric optical interference layer. For example, a silicate glass bead with refractive index as low as about 1.50 may be used as a core because of the low cost and high availability of soda-lime-silica (i.e., window glass). Optionally, cores may further comprise a colorant. Exemplary materials that may be utilized as a core include glasses (e.g., mixtures of metal oxides such as $SiO_2$, $B_2O_3$, $TiO_2$, $ZrO_2$, $Al_2O_3$, BaO, SrO, CaO, MgO, $K_2O$, $Na_2O$); glass-ceramics as described in U.S. Pat. No. 6,245,700, and solid, transparent, non-vitreous, ceramic particles as described in, for example, U.S. Pat. No. 4,564,556 (Lange) and U.S. Pat. No. 4,758,469 (Lange), the disclosures of which are incorporated herein by reference. Colorants include transition metals, dyes, and/or pigments selected according to their compatibility with the chemical composition of the core, and the manufacturing conditions utilized.

The magnitude of retroreflection may be increased by coating onto the concentrically coated retroreflective element an integral hemispherical reflector as described in, for example, U.S. Pat. No. 2,963,378 (Palmquist et al.), the disclosure of which is incorporated herein by reference.

The manufacture of retroreflective patterns using the coated retroreflective elements of the invention are described in the following paragraphs and are applicable to the manufacture of any of a variety of articles that incorporate the retroreflective coated retroreflective elements of the invention as a component thereof. Retroreflective patterns may be formed in a variety of ways. In one exemplary method, a carrier sheet (e.g., a polyethylene film) having a monolayer of partially exposed retroreflective elements is prepared by the method described, for example, in U.S. Pat. No. 4,367,920 (Tung et al.), the entire disclosure of which is incorporated herein by reference. An adhesive binder material (e.g., a glue, a pressure-sensitive adhesive, or a hot melt adhesive) is applied to the exposed retroreflective elements in an image-wise manner (e.g., by screen printing, ink jet printing, or thermal transfer printing) as described, for example, in U.S. Pat. No. 5,612,119 (Olsen et al.), or U.S. Pat. No. 5,916,399 (Olsen), the disclosures of which are incorporated herein by reference. The imaged adhesive binder is brought into contact with the substrate, whereby the binder becomes affixed to the substrate. The carrier sheet is then stripped off, thereby exposing the retroreflective elements, which remain affixed to the binder. This transfer printing process may be repeated with different retroreflective elements and can lead to retroreflective and/or retrochromic patterns having, for example, three or more regions, each with a distinctive appearance when viewed in retroreflective mode.

In another method, adhesive binder may be applied in an image-wise manner directly to a substrate (e.g., by heat lamination, screen printing, pressure lamination, ink jet printing, or spraying). The applied adhesive is flood coated with the above described retroreflective elements so that the retroreflective elements adhere to the adhesive. Additional applications of adhesive binder can be applied in an image-wise manner followed by flood coating with other retroreflective elements to provide a pattern having more than one retroreflective region on the surface of a substrate. An optional protective layer (e.g., a transparent thermoplastic film) may be bonded (e.g., heat laminated or adhesively bonded) to exposed retroreflective elements.

Useful substrates for retroreflective articles include any of a variety materials such as metals, wood, thermoplastic film (e.g., polyurethane), glass, ceramic, paper, cloth, fabric, woven and nonwoven materials and the like. A substrate may be at least partially transparent, translucent, and/or opaque. In some embodiments, the substrate is transparent throughout its entirety. The substrate may be homogenous or heterogeneous in composition and typically includes first and second opposed major surfaces.

In some embodiments of the present invention, an adhesive layer is applied to the substrate. The adhesive layer may, optionally, contact a release liner (e.g., a polyethylene or silicone coated paper or film). The adhesive layer typically comprises at least one of a hot melt adhesive, a thermoset adhesive, or a pressure-sensitive adhesive. Exemplary hot melt adhesives include thermoplastic hot melt adhesives (e.g., polyesters, polyurethanes, vinyl acetate copolymers, or polyolefins), and thermoset hot melt adhesives (e.g., moisture activated adhesives, light activated adhesives, radiation activated adhesives, or combinations thereof). Exemplary thermoset adhesives include glues, urethanes, epoxies, and aminoplasts. Exemplary pressure-sensitive adhesives include acrylate copolymers (e.g., a copolymer of isooctyl acrylate and acrylic acid), desirably applied to the substrate as a latex as described in, for example, U.S. Pat. No. 4,630,891 (Li), the disclosure of which is incorporated herein by reference.

While specific articles have been described in detail as embodiments of the invention, it will be appreciated that any article utilizing or incorporating the retroreflective elements described herein will be within the scope of the present invention.

The following non-limiting examples illustrate specific embodiments of the present invention.

EXAMPLES

The following standard procedures were employed.
Procedure A: Preparation of Retroreflective Elements Retroreflective elements with multiple complete concentric optical interference layers were formed by depositing metal oxide (titania or silica) coatings onto transparent bead cores using an atmospheric pressure chemical vapor deposition process (APCVD) similar to that described in U.S. Pat. No. 5,673,148 (Morris et al.), the disclosure of which is incorporated herein by reference thereto. The reactor had an internal diameter of 30 mm. The initial charge of transparent bead cores weighed 60 g. For silica coatings, the reaction temperature was set at 40° C. while titania coatings were deposited using a reaction temperature of 140° C. The desired reaction temperature was controlled by immersing the reactor in a heated oil bath maintained at a constant temperature. The bed of beads was fluidized with a stream of nitrogen gas introduced into the reactor through a glass frit reactor base. Once satisfactory fluidization was achieved, water vapor was introduced into the reactor through the base glass frit using a stream of nitrogen carrier gas passed through a water bubbler. The metal oxide precursor compounds (either $SiCl_4$ or $TiCl_4$) were vaporized by passing nitrogen carrier gas through a bubbler containing the neat liquid precursor and introducing the vaporized compounds into the reactor through a glass tube extending downward into the fluidized bead bed.

Multiple coatings were deposited by repeating the procedure for samples of retroreflective elements having previously deposited coatings.

Flow rates of the reactant-laden carrier gases and reaction temperatures for silica and titania coatings are reported in Table 1.

TABLE 1

| Type of coating | Reaction Temp (° C.) | Precursor | Precursor bubbler flow rate (cc/min) | Water bubbler flow rate (cc/min) | Extra Nitrogen flow rate (cc/min) |
|---|---|---|---|---|---|
| $SiO_2$ | 40 | $SiCl_4$ | 40 | 600 | 500 |
| $TiO_2$ | 140 | $TiCl_4$ | 600 | 600 | 500 |

In some instances, samples of different coating thicknesses were made by varying the coating times. This was accomplished by removing a small volume of retroreflective elements from the reactor at different times. Coating rates were determined by fracturing certain concentrically coated glass retroreflective elements that had been sampled from the reactor at known coating deposition times and examining the fracture pieces with a scanning electron microscope to directly measure the coating thicknesses. Thereafter, the thicknesses of the concentric coatings were calculated from known coating times and coating rates. A coating rate of ~2 nm/min was typical for the silica coatings, and a coating rate of ~5 nm/min was typical for the titania coatings.

Procedure B: Patch Brightness

Measurements of retroreflected brightness include "patch brightness" measurements of the coefficient of retroreflection (Ra) of a layer of retroreflective elements. Clear Patch Brightness as well as White Patch Brightness measurements were made. Clear Patch Brightness results are designated herein as "Ra (CP)" and White Patch Brightness results are designated as "Ra (WP)." In either case, layers of retroreflective elements were made by sprinkling retroreflective elements onto an adhesive tape and placing the construction under a retroluminometer. For Clear Patch Brightness, sample constructions were prepared by partially embedding the retroreflective elements in the adhesive of a transparent tape (3M Scotch 375 Clear Tape) and placing the tape on top of a sheet of paper having a dark (black) background. White Patch Brightness sample constructions were prepared by partially embedding the retroreflective elements in the adhesive of a tape in which the adhesive was pigmented with titanium dioxide to impart a white color. Retroreflective elements were typically embedded so that <50% of the retroreflective element diameter was sunk in the adhesive. For each of the Patch Brightness constructions, the Ra in $Cd/m^2/lux$ was determined according to the procedure established in Procedure B of ASTM Standard E 809-94a, measured at an entrance angle of –4.0 degrees and an observation angle of 0.2 degrees. The photometer used for those measurements is described in U.S. Defensive Publication No. T987,003.

Procedure C: Color Measurements

The retroreflective color or retrochromic effects were quantified by measuring color coordinates using an optical spectrometer (MultiSpec Series System with an MCS UV-NIR spectrometer and 50 watt halogen light source and bifurcated optical fiber probe, commercially available from Tec5 AG, Oberursol, Germany). Concentrically coated retroreflective elements were partially embedded in the adhesive of a commercially available tape (3M Scotch 375 Clear Tape). The embedded retroreflective elements were placed under a fiber optic probe at a distance of ~5 mm, and spectral measurements were made in the wavelength range 300 nm-1050 nm using a black background. A front surface mirror was used as the reference, and all measurements were normalized. Chromaticity coordinates were calculated from the reflectance spectra using (MultiSpec® Pro software with color module, commercially available from Tec5 AG, Oberursol, Germany). Color coordinates were measured for retroreflective elements made according to certain Comparative Examples and certain Examples, as specified herein. A CIE chromaticity diagram (1931 version) was referenced as well as a standard black body curve. The black body curve passes through white between approximately 4800K and 7500K. The corresponding color coordinates at these temperatures are (0.353, 0.363) and (0.299, 0.317). Measurements made from retroreflective elements showing little or no visible color in retroreflection lay within 0.01 of the black body radiation curve between 4800K and 7500K. It should be noted that the (x, y) coordinates correspond to the 1964 10 degree field of view modification to the original 1931 coordinates. The CIE chart and black body radiation curves are described in Zukauskas et al., *Introduction to Solid State Lighting*, John Wiley and Sons (2002); Chapter 2 (Vision, Photometry, and Colorimetry), pp. 7-15.

Comparative Examples 1-44

The bead cores used in the preparation of Comparative Examples 1-44 are referred to herein as Type I bead cores which were transparent glass beads having a refractive index of about 1.93, an average diameter of about 60 μm, and an approximate composition of 42.5% $TiO_2$, 29.4% BaO, 14.9% $SiO_2$, 8.5% $Na_2O$, 3.3% $B_2O_3$, and 1.4% $K_2O$ by weight. Comparative Example 1 was an uncoated Type I bead core. Comparative Examples 2-44 were prepared according to the above Procedure A and comprised a single complete concentric interference layer. For Comparative Examples 2-25, the single complete concentric interference layer was silica while Comparative Examples 26-44 had a single complete concentric interference layer of titania. Coating times, calculated coating thicknesses, and retroreflected brightness (Ra) of Clear Patch constructions made with the bead cores are reported in Table 2.

TABLE 2

| Comparative Example | Coating material | Coating time (min) | Estimated coating thickness (nm) | Ra (CP) |
|---|---|---|---|---|
| 1 | none | uncoated | uncoated | 7.7 |
| 2 | $SiO_2$ | 18 | 36 | 9.76 |

TABLE 2-continued

| Comparative Example | Coating material | Coating time (min) | Estimated coating thickness (nm) | Ra (CP) |
|---|---|---|---|---|
| 3 | $SiO_2$ | 22 | 44 | 10.5 |
| 4 | $SiO_2$ | 26 | 52 | 11.7 |
| 5 | $SiO_2$ | 31 | 62 | 12.8 |
| 6 | $SiO_2$ | 34 | 68 | 13.5 |
| 7 | $SiO_2$ | 37 | 74 | 14.4 |
| 8 | $SiO_2$ | 40 | 80 | 15.1 |
| 9 | $SiO_2$ | 44 | 88 | 16.1 |
| 10 | $SiO_2$ | 48 | 96 | 17 |
| 11 | $SiO_2$ | 52 | 104 | 17.5 |
| 12 | $SiO_2$ | 55 | 110 | 17.1 |
| 13 | $SiO_2$ | 58 | 116 | 17 |
| 14 | $SiO_2$ | 61 | 122 | 15.3 |
| 15 | $SiO_2$ | 63 | 126 | 14.7 |
| 16 | $SiO_2$ | 65 | 130 | 13.2 |
| 17 | $SiO_2$ | 67 | 134 | 12.3 |
| 18 | $SiO_2$ | 69 | 138 | 11.1 |
| 19 | $SiO_2$ | 71 | 142 | 10.2 |
| 20 | $SiO_2$ | 73 | 146 | 9.3 |
| 21 | $SiO_2$ | 76 | 152 | 8.6 |
| 22 | $SiO_2$ | 78 | 156 | 8.2 |
| 23 | $SiO_2$ | 81 | 162 | 8.16 |
| 24 | $SiO_2$ | 84 | 168 | 8.55 |
| 25 | $SiO_2$ | 88 | 176 | 9.3 |
| 26 | $TiO_2$ | 6 | 30 | 18.5 |
| 27 | $TiO_2$ | 10 | 50 | 26.7 |
| 28 | $TiO_2$ | 13 | 65 | 30.1 |
| 29 | $TiO_2$ | 19 | 95 | 27.9 |
| 30 | $TiO_2$ | 22 | 110 | 22.7 |
| 31 | $TiO_2$ | 26 | 130 | 13.9 |
| 32 | $TiO_2$ | 30 | 150 | 16.1 |
| 33 | $TiO_2$ | 32 | 160 | 17.5 |
| 34 | $TiO_2$ | 38 | 190 | 21.3 |
| 35 | $TiO_2$ | 40 | 200 | 21.1 |
| 36 | $TiO_2$ | 42 | 210 | 17.9 |
| 37 | $TiO_2$ | 45 | 225 | 17.7 |
| 38 | $TiO_2$ | 48 | 240 | 17.8 |
| 39 | $TiO_2$ | 50 | 250 | 18.1 |
| 40 | $TiO_2$ | 53 | 265 | 17.7 |
| 41 | $TiO_2$ | 55 | 275 | 18.4 |
| 42 | $TiO_2$ | 58 | 290 | 17.6 |
| 43 | $TiO_2$ | 60 | 300 | 18.6 |
| 44 | $TiO_2$ | 65 | 325 | 18.6 |

Retroreflective color was assessed for Comparative Examples 1, 6, 9, 11 and 13 according to Procedure C. Table 2A lists the color coordinates, observed color, distance from black body radiation curve between 4800K and 7500K and the coordinates for the closest point on the black body radiation curve between 4800K and 7500K. The designation "L/N" indicates little or no color was observed.

TABLE 2A

| Comparative Example | Chromaticity coordinate measurements (x, y) | Observed color | Distance from black body radiation curve between 4800K and 7500K | Closest point on black body curve (x, y), between 4800K and 7500K |
|---|---|---|---|---|
| 1 | 0.327, 0.34 | L/N | 0.0018 | 0.326, 0.341 |
| 6 | 0.318, 0.334 | L/N | 0.0004 | 0.318, 0.334 |
| 9 | 0.331, 0.346 | L/N | 0.0012 | 0.332, 0.347 |
| 11 | 0.341, 0.355 | L/N | 0.001 | 0.342, 0.355 |
| 13 | 0.344, 0.356 | L/N | 0.0007 | 0.344, 0.357 |

Examples 45-69

Examples 45-69 employ the Type I bead cores. The coated retroreflective elements were prepared according to Procedure A so that the coated retroreflective elements included two concentric optical interference layers. Examples 45-60 were made using Type I bead cores coated with an inner or first optical interference layer of silica and an outer or second optical interference layer of titania. Examples 61-69 were made with Type I bead cores and were coated with an inner or first optical interference layer of titania and an outer or second optical interference layer of silica. Coating materials, thicknesses, and retroreflected brightness (Ra) of clear patch constructions are reported in Table 3.

TABLE 3

| Example | Inner layer coating material | Estimated inner layer thickness (nm) | Outer layer coating material | Estimated outer layer thickness (nm) | Ra (CP) |
|---|---|---|---|---|---|
| 45 | $SiO_2$ | 110 | $TiO_2$ | 30 | 46.1 |
| 46 | $SiO_2$ | 110 | $TiO_2$ | 50 | 56.4 |
| 47 | $SiO_2$ | 110 | $TiO_2$ | 60 | 58.4 |
| 48 | $SiO_2$ | 110 | $TiO_2$ | 80 | 56.7 |
| 49 | $SiO_2$ | 110 | $TiO_2$ | 100 | 56.6 |
| 50 | $SiO_2$ | 110 | $TiO_2$ | 125 | 51 |
| 51 | $SiO_2$ | 110 | $TiO_2$ | 150 | 42 |
| 52 | $SiO_2$ | 110 | $TiO_2$ | 165 | 35.2 |
| 53 | $SiO_2$ | 110 | $TiO_2$ | 180 | 32.7 |
| 54 | $SiO_2$ | 110 | $TiO_2$ | 200 | 35.9 |
| 55 | $SiO_2$ | 110 | $TiO_2$ | 215 | 41.7 |
| 56 | $SiO_2$ | 40 | $TiO_2$ | 50 | 31.2 |
| 57 | $SiO_2$ | 40 | $TiO_2$ | 75 | 42.4 |
| 58 | $SiO_2$ | 40 | $TiO_2$ | 100 | 44.4 |
| 59 | $SiO_2$ | 40 | $TiO_2$ | 125 | 28.5 |
| 60 | $SiO_2$ | 40 | $TiO_2$ | 135 | 27.1 |
| 61 | $TiO_2$ | 60 | $SiO_2$ | 40 | 40.1 |
| 62 | $TiO_2$ | 60 | $SiO_2$ | 50 | 45.4 |
| 63 | $TiO_2$ | 60 | $SiO_2$ | 60 | 49.4 |
| 64 | $TiO_2$ | 60 | $SiO_2$ | 70 | 51.6 |
| 65 | $TiO_2$ | 60 | $SiO_2$ | 80 | 51.3 |
| 66 | $TiO_2$ | 60 | $SiO_2$ | 90 | 47.1 |
| 67 | $TiO_2$ | 60 | $SiO_2$ | 100 | 43.8 |
| 68 | $TiO_2$ | 60 | $SiO_2$ | 110 | 37.4 |
| 69 | $TiO_2$ | 60 | $SiO_2$ | 120 | 26.1 |

Retroreflective color was assessed for Examples 45, 47, 49, 50, 52, 54 and 55 according to Procedure C. Table 3A lists the color coordinates, observed color, distance from black body radiation curve between 4800K and 7500K and the coordinates for the closest point on the black body radiation curve between 4800K and 7500K. The designation "L/N" indicates little or no color was observed.

TABLE 3A

| Example | Chromaticity coordinate measurements (x, y) | Observed color | Distance from black body radiation curve between 4800K and 7500K | Closest point on black body curve (x, y) between 4800K and 7500K |
|---|---|---|---|---|
| 45 | 0.322, 0.347 | L/N | 0.0068 | 0.326, 0.341 |
| 47 | 0.343, 0.358 | L/N | 0.0017 | 0.344, 0.357 |
| 49 | 0.365, 0.382 | light yellow | 0.0225 | 0.353, 0.363 |
| 50 | 0.384, 0.393 | yellow | 0.0431 | 0.353, 0.363 |
| 52 | 0.34, 0.312 | purple | 0.0314 | 0.32, 0.336 |
| 54 | 0.292, 0.332 | light blue | 0.0158 | 0.302, 0.320 |
| 55 | 0.313, 0.363 | light green | 0.0248 | 0.33, 0.345 |

Examples 70-80

Examples 70-80 employed Type I bead cores as well as the same coating materials and used for the preparation of Examples 1-44. The coated retroreflective elements were prepared according to Procedure A with Examples 70-80 made to include three complete concentric interference layers. Coating materials, thicknesses, and retroreflected brightness (Ra) of clear patch constructions are reported in Table 4.

TABLE 4

| Example | Inner layer | Inner layer thickness (nm) | Second layer | Second layer thickness (nm) | Outer layer | Outer layer thickness (nm) | Ra (CP) |
|---|---|---|---|---|---|---|---|
| 70 | $SiO_2$ | 110 | $TiO_2$ | 60 | $SiO_2$ | 32 | 63 |
| 71 | $SiO_2$ | 110 | $TiO_2$ | 60 | $SiO_2$ | 52 | 79.1 |
| 72 | $SiO_2$ | 110 | $TiO_2$ | 60 | $SiO_2$ | 72 | 102 |
| 73 | $SiO_2$ | 110 | $TiO_2$ | 60 | $SiO_2$ | 92 | 113 |
| 74 | $SiO_2$ | 110 | $TiO_2$ | 60 | $SiO_2$ | 98 | 113 |
| 75 | $SiO_2$ | 110 | $TiO_2$ | 60 | $SiO_2$ | 106 | 109 |
| 76 | $SiO_2$ | 110 | $TiO_2$ | 60 | $SiO_2$ | 112 | 102 |
| 77 | $SiO_2$ | 110 | $TiO_2$ | 60 | $SiO_2$ | 116 | 95.1 |
| 78 | $SiO_2$ | 40 | $TiO_2$ | 110 | $SiO_2$ | 10 | 24 |
| 79 | $SiO_2$ | 40 | $TiO_2$ | 110 | $SiO_2$ | 20 | 26.9 |
| 80 | $SiO_2$ | 40 | $TiO_2$ | 110 | $SiO_2$ | 36 | 31.1 |

Retroreflective color was assessed according to Procedure C for Examples 70 and 72-75. Table 4A lists the color coordinates, observed color, distance from black body radiation curve between 4800K and 7500K and the coordinates of the closest point on the black body radiation curve between 4800K and 7500K. The designation "L/N" indicates little or no color was observed.

TABLE 4A

| Example | Chromaticity coordinate measurements (x, y) | Observed color | Distance from black body radiation curve between 4800K and 7500K | Closest point on black body curve (x, y) between 4800K and 7500K |
|---|---|---|---|---|
| 70 | 0.332, 0.352 | L/N | 0.0042 | 0.334, 0.348 |
| 72 | 0.341, 0.372 | light yellow | 0.0138 | 0.35, 0.362 |
| 73 | 0.371, 0.394 | yellow | 0.036 | 0.353, 0.363 |
| 74 | 0.385, 0.399 | yellow-orange | 0.0487 | 0.353, 0.363 |
| 75 | 0.4, 0.394 | orange | 0.057 | 0.353, 0.363 |

Comparative Examples 81-95 and Examples 96-104

Comparative Examples 81-95 and Examples 96-104 were prepared in the same manner as in Comparative Examples 1-15 and Examples 45-53, respectively. Retroreflective color from these coated retroreflective element samples was observed and recorded. Observed retroreflective color was determined by viewing through a retroreflective viewer (available under the trade designation "3M VIEWER" from 3M Company, St. Paul, Minn.). A layer of retroreflective elements was partially embedded in a polymer adhesive (3M Scotch 375 Clear Tape) to determine Clear Patch brightness. Table 5 summarizes the construction, observed retroreflective color and Clear Patch Brightness for the samples.

Comparative Examples 105-107 and Examples 108-110

White patch brightness measurements were made for several of the previously described coated retroreflective element samples. Table 6 summarizes the construction of the coated retroreflective elements as well as White Patch Brightness for these samples.

TABLE 6

| Sample | Coated as in Example | Layer sequence | Outer layer coating material | Estimated outer layer thickness (nm) | Ra (WP) |
|---|---|---|---|---|---|
| C. Ex. 105 | 1 | none | uncoated | uncoated | 18.1 |
| C. Ex. 106 | 11 | SiO$_2$ | SiO$_2$ | 104 | 23.6 |

TABLE 5

| Sample | Inner layer | Inner layer thickness (nm) | Outer layer | Outer layer thickness (nm) | Ra (CP) | Retroreflective color from clear patch constructions |
|---|---|---|---|---|---|---|
| C. Ex. 81 | uncoated | uncoated | uncoated | uncoated | 7.7 | L/N |
| C. Ex. 82 | SiO$_2$ | 36 | none | 0 | 9.76 | L/N |
| C. Ex. 83 | SiO$_2$ | 44 | none | 0 | 10.5 | L/N |
| C. Ex. 84 | SiO$_2$ | 52 | none | 0 | 11.7 | L/N |
| C. Ex. 85 | SiO$_2$ | 62 | none | 0 | 12.8 | L/N |
| C. Ex. 86 | SiO$_2$ | 68 | none | 0 | 13.5 | L/N |
| C. Ex. 87 | SiO$_2$ | 74 | none | 0 | 14.4 | L/N |
| C. Ex. 88 | SiO$_2$ | 80 | none | 0 | 15.1 | orange |
| C. Ex. 89 | SiO$_2$ | 88 | none | 0 | 16.1 | rust |
| C. Ex. 90 | SiO$_2$ | 96 | none | 0 | 17 | purple |
| C. Ex. 91 | SiO$_2$ | 104 | none | 0 | 17.5 | violet |
| C. Ex. 92 | SiO$_2$ | 110 | none | 0 | 17.1 | bluish violet |
| C. Ex. 93 | SiO$_2$ | 116 | none | 0 | 17 | blue |
| C. Ex. 94 | SiO$_2$ | 122 | none | 0 | 15.3 | blue |
| C. Ex. 95 | SiO$_2$ | 126 | none | 0 | 14.7 | bluish green |
| Ex. 96 | SiO$_2$ | 110 | TiO$_2$ | 30 | 46.1 | L/N |
| Ex. 97 | SiO$_2$ | 110 | TiO$_2$ | 50 | 56.4 | L/N |
| Ex. 98 | SiO$_2$ | 110 | TiO$_2$ | 60 | 58.4 | L/N |
| Ex. 99 | SiO$_2$ | 110 | TiO$_2$ | 80 | 56.7 | L/N |
| Ex. 100 | SiO$_2$ | 110 | TiO$_2$ | 100 | 56.6 | creamish yellow |
| Ex. 101 | SiO$_2$ | 110 | TiO$_2$ | 125 | 51 | yellow |
| Ex. 102 | SiO$_2$ | 110 | TiO$_2$ | 165 | 35.2 | red |
| Ex. 103 | SiO$_2$ | 110 | TiO$_2$ | 180 | 32.7 | purple |
| Ex. 104 | SiO$_2$ | 110 | TiO$_2$ | 215 | 35.9 | violet |

* L/N - little or no color observed in retroreflection

TABLE 6-continued

| Sample | Coated as in Example | Layer sequence | Outer layer coating material | Estimated outer layer thickness (nm) | Ra (WP) |
|---|---|---|---|---|---|
| C. Ex. 107 | 28 | $TiO_2$ | $TiO_2$ | 150 | 40.1 |
| Ex. 108 | 47 | $SiO_2$, $TiO_2$ | $TiO_2$ | 60 | 67 |
| Ex. 109 | 73 | $SiO_2$, $TiO_2$, $SiO_2$ | $SiO_2$ | 98 | 114 |
| Ex. 110 | 80 | $SiO_2$, $TiO_2$, $SiO_2$ | $SiO_2$ | 36 | 33 |

Comparative Examples 111-123

Glass-ceramic bead cores were prepared according to the methods described in U.S. Pat. No. 6,245,700. The Type II bead cores had a composition of $ZrO_2$ 12.0%, $Al_2O_3$ 29.5%, $SiO_2$ 16.2%, $TiO_2$ 28.0%, $MgO$ 4.8%, $CaO$ 9.5% (wt %), with a refractive index of ~1.89 and an average diameter about 60 um. The bead cores were coated with a single layer $SiO_2$ or $TiO_2$ according to Procedure A. The construction of the coated retroreflective elements and both Clear Patch Brightness and White Patch Brightness determinations are reported in Table 7.

TABLE 7

| Comparative Example | Coating material | Estimated coating thickness (nm) | Ra (CP) | Ra (WP) |
|---|---|---|---|---|
| 111 | uncoated | uncoated | 3.1 | 15.2 |
| 112 | $SiO_2$ | 20 | 5.6 | 16.8 |
| 113 | $SiO_2$ | 36 | 4.71 | 16.2 |
| 114 | $SiO_2$ | 50 | 5.08 | 16.1 |
| 115 | $SiO_2$ | 64 | 5.45 | 16.4 |
| 116 | $SiO_2$ | 78 | 5.6 | 16.3 |
| 117 | $SiO_2$ | 92 | 5.7 | 17.6 |
| 118 | $SiO_2$ | 106 | 6.22 | 16.3 |
| 119 | $TiO_2$ | 40 | 11 | 19.3 |
| 120 | $TiO_2$ | 65 | 14.4 | 21.4 |
| 121 | $TiO_2$ | 95 | 12.1 | 23 |
| 122 | $TiO_2$ | 120 | 6.5 | 17.6 |
| 123 | $TiO_2$ | 150 | 6.4 | 16.8 |

Comparative Examples 124-145

Bead cores designated as Type III were prepared according to the methods described in U.S. Pat. No. 6,245,700. The Type III bead cores were made of a glass-ceramic material having a composition of $TiO_2$ 61.3%, $ZrO_2$ 7.6%, $La_2O_3$ 29.1%, $ZnO$ 2% by weight, with RI ~2.4, and an average diameter of about 60 um. The bead cores were coated with single layer coatings of $SiO_2$ or $TiO_2$ according to Procedure A. Clear Patch Brightness and White Patch Brightness measurements were recorded by covering the patch surface with water. Coating materials, coating thicknesses and the wet White Patch and wet Clear Patch Brightness measurements are summarized in Table 8.

TABLE 8

| Comparative Example | Coating material | Coating thickness (nm) | Wet Ra (CP) | Wet Ra (WP) |
|---|---|---|---|---|
| 124 | uncoated | 0 | 3.91 | 11.4 |
| 125 | $SiO_2$ | 36 | 4.8 | 11.5 |
| 126 | $SiO_2$ | 48 | 5.03 | 12.2 |
| 127 | $SiO_2$ | 60 | 5.3 | |
| 128 | $SiO_2$ | 72 | 5.83 | 13.6 |
| 129 | $SiO_2$ | 84 | 6.04 | |
| 130 | $SiO_2$ | 96 | 6.48 | 13.4 |
| 131 | $SiO_2$ | 108 | 6.54 | 13.5 |
| 132 | $SiO_2$ | 120 | 6.7 | 12.9 |
| 133 | $SiO_2$ | 132 | 5.7 | |
| 134 | $SiO_2$ | 144 | 6.09 | |
| 135 | $SiO_2$ | 156 | 5.44 | |
| 136 | $SiO_2$ | 168 | 5.1 | |
| 137 | $SiO_2$ | 180 | 4.5 | |
| 138 | $TiO_2$ | 30 | 4.12 | 11 |
| 139 | $TiO_2$ | 60 | 3.7 | 9.51 |
| 140 | $TiO_2$ | 90 | 2.73 | 11.7 |
| 141 | $TiO_2$ | 120 | 2.79 | 10.7 |
| 142 | $TiO_2$ | 162 | 3.6 | 11.6 |
| 143 | $TiO_2$ | 198 | 4.6 | 10.9 |
| 144 | $TiO_2$ | 240 | 3.75 | |
| 145 | $TiO_2$ | 288 | 3.1 | |

Example 146

Three complete concentric optical interference layers were deposited on Type III cores according to Procedure A. Table 9 summarizes the coating materials, coating thicknesses and White Patch and Clear Patch Brightness measurements. The White Patch and Clear Patch Brightness measurements were made under wet conditions as in Examples 124-145.

TABLE 9

| Example | Inner layer coating material | Inner layer thickness (nm) | Second layer coating material | Second layer thickness (nm) | Outer layer coating material | Outer layer thickness (nm) | Wet Ra (CP) | Wet Ra (WP) |
|---|---|---|---|---|---|---|---|---|
| 146 | $SiO_2$ | 120 | $TiO_2$ | 60 | $SiO_2$ | 110 | 11.3 | 17.2 |

Embodiments of the invention have been described in some detail. Those skilled in the art will appreciate that the invention is not to be limited to the described embodiments, and that various changes and modifications can be made to the embodiments without departing from the spirit and scope of the invention.

What is claimed is:

1. A retroreflective element comprising:
a solid spherical core wherein the solid spherical core is transparent and comprises an outer core surface, the outer core surface providing a first interface;
a first complete concentric optical interference layer having a thickness of up to approximately 600 nm, wherein the first complete concentric optical interference layer is transparent and has (i) an inner surface directly overlying the outer core surface and (ii) an outer surface, the outer surface of the first complete concentric optical interference layer providing a second interface;
a second complete concentric optical interference layer having a thickness of up to approximately 600 nm, wherein the second complete concentric optical interference layer is transparent and has (i) an inner surface directly overlying the outer surface of the first complete concentric optical interference layer and (ii) an outer surface, the outer surface of the second complete concentric optical interference layer providing a third interface.

2. The retroreflective element according to claim 1, wherein the first complete concentric optical interference layer and the second complete concentric optical interference layer each comprise material selected from the group consisting of $TiO_2$, $SiO_2$, $ZnS$, $CdS$, $CeO_2$, $ZrO_2$, $Bi_2O_3$, $ZnSe$, $WO_3$, $PbO$, $ZnO$, $Ta_2O_5$, $Al_2O_3$, $B_2O_3$, $MgO$, $AlF_3$, $CaF_2$, $CeF_3$, $LiF$, $MgF_2$, $Na_3AlF_6$, and combinations of two or more of the foregoing.

3. The retroreflective element according to claim 1, wherein the difference between the refractive index of the spherical core and the refractive index of the first complete concentric optical interference layer is greater than 0.1; and wherein the difference between the refractive index of the first complete concentric optical interference layer and the refractive index of the second complete concentric optical interference layer is greater than 0.1.

4. The retroreflective element according to claim 3 wherein the core has a refractive index within the range from 1.55 to 2.5, the first complete concentric optical interference layer comprises a first material and the second complete concentric optical interference layer comprises a second material that is different than the first material.

5. The retroreflective element according to claim 4, wherein the core is spherical having a diameter between 30 microns and 90 microns.

6. The retroreflective element according to claim 5 wherein the first material is silica and the second material is titania.

7. The retroreflective element according to claim 5 wherein the first material is titania and the second material is silica.

8. The retroreflective element according to claim 1 further comprising a third complete concentric optical interference layer having an inner surface directly overlying the outer surface of the second complete concentric optical interference layer and an outer surface, the outer surface of the third complete concentric optical interference layer providing a fourth interface.

9. The retroreflective article according to claim 8, wherein the article, when viewed in a retroreflective mode, exhibits retroreflective color.

10. A retroreflective article comprising:
A substrate having a first major surface and a second major surface;
A plurality of retroreflective elements according to claim 1 affixed along the first major surface of the substrate, the article being retroreflective.

11. The retroreflective article according to claim 10, having a coefficient of retroreflection, measured at −4 degrees entrance angle and 0.2 degrees observation angle, greater than 50 $Cd/lux/m^2$, the article comprising no auxiliary reflector, the coefficient of retroreflection value being at least 2.5 times greater than that of an article comprising retroreflective elements consisting of the solid spherical core having no complete concentric optical interference layers thereon.

12. The retroreflective article according to claim 10, the article comprising no auxiliary reflector, having a coefficient of retroreflection, measured at −4 degrees entrance angle and 0.2 degrees observation angle, greater than 50 $Cd/lux/m^2$ and a retroreflective color with chromaticity coordinates defining a point on the CIE chromaticity diagram (1931 version) that lies within 0.01 of the line that describes black body emission between 4800K and 7500K.

13. The retroreflective article according to claim 10, further comprising an auxiliary reflector.

14. The retroreflective article according to claim 10, wherein the article, when viewed in a retroreflective mode, exhibits enhanced retroreflective brightness.

15. The retroreflective article according to claim 10, wherein the article, when viewed in a retroreflective mode, exhibits interference-enhanced retroreflective brightness, wherein the article exhibits a coefficient of retroreflection value at least 2 times greater than that of an otherwise identical article comprising retroreflective elements consisting of the solid spherical core having no complete concentric optical interference layers thereon.

16. The retroreflective article according to claim 15, wherein the article exhibits a coefficient of retroreflection value at least 4 times greater than that of an otherwise identical article comprising retroreflective elements consisting of the solid spherical core having no complete concentric optical interference layers thereon.

17. The retroreflective article according to claim 10, wherein the article, when viewed in a retroreflective mode, exhibits enhanced retroreflective brightness and does not exhibit retroreflective color.

18. The retroreflective article according to claim 17, further comprising an auxiliary reflector.

19. The retroreflective article according to claim 10, wherein the retroreflective elements are affixed to the first major surface of the substrate with an adhesive, a portion of each retroreflective element embedded into the adhesive.

20. The retroreflective article according to claim 10, wherein the substrate is a thermoplastic polymer and the retroreflective elements are embedded into the substrate.

21. The retroreflective article according to claim 10 wherein the substrate comprises a polymer.

22. The retroreflective article according to claim 10, wherein the retroreflective elements further each comprise a third complete concentric optical interference layer having an inner surface overlying the outer surface of the second complete concentric optical interference layer and an outer surface, the outer surface of the third complete concentric optical interference layer providing a fourth interface.

23. The retroreflective article according to claim 22, having a coefficient of retroreflection, measured at −4 degrees entrance angle and 0.2 degrees observation angle, greater than 100 Cd/lux/m², the article comprising no auxiliary reflector.

24. The retroreflective article according to claim 22, wherein the difference between the refractive index of the spherical core and the refractive index of the first complete concentric optical interference layer is greater than about 0.1; and wherein the difference between the refractive index of the first complete concentric optical interference layer and the refractive index of the second complete concentric optical interference layer is greater than about 0.1; and wherein the difference between the refractive index of the second complete concentric optical interference layer and the refractive index of the third complete concentric optical interference layer is greater than about 0.1.

25. The retroreflective article according to claim 22 wherein the core has a refractive index within the range from about 1.55 to about 2.5, the first complete concentric optical interference layer comprises silica, the second complete concentric optical interference layer comprises titania, and the third complete concentric optical interference layer comprises silica.

26. The retroreflective article according to claim 25, wherein the core is spherical having a diameter between about 30 microns and about 90 microns, wherein the first complete concentric optical interference layer has a thickness between about 95 nm and about 120 nm, the second complete concentric optical interference layer has a thickness between about 45 nm and about 80 nm and the third complete concentric optical interference layer has a thickness between about 70 nm and about 115 nm.

27. The retroreflective article according to claim 22 wherein the spherical core has a refractive index within the range from about 1.55 to about 2.5, the first complete concentric optical interference layer comprises titania, the second complete concentric optical interference layer comprises silica, and the third complete concentric optical interference layer comprises titania.

28. The retroreflective article according to claim 10, wherein the first complete concentric optical interference layer and, the second complete concentric optical interference layer and the third complete concentric optical interference layer each comprise material selected from the group consisting of $TiO_2$, $SiO_2$, ZnS, CdS, $CeO_2$, $ZrO_2$, $Bi_2O_3$, ZnSe, $WO_3$, PbO, ZnO, $Ta_2O_5$, $Al_2O_3$, $B_2O_3$, MgO, $AlF_3$, $CaF_2$, $CeF_3$, LiF, $MgF_2$, $Na_3AlF_6$, and combinations of two or more of the foregoing.

29. The retroreflective article according to claim 10, wherein the retroreflective article is selected from at least one of: a pavement marking, a security laminate, and a garment.

30. The retroreflective element according to claim 1, wherein the solid spherical core has a core index of refraction; the first complete concentric optical interference layer has a first index of refraction that is lower than the core index of refraction; and the second complete concentric optical interference layer has a second index of refraction that is higher than the first index of refraction.

31. The retroreflective element according to claim 30, wherein the core index of refraction is between about 1.8 and about 1.95 or between about 2.0 and about 2.6; the first index of refraction is between about 1.4 and about 1.9; and the second index of refraction is between about 2.0 and about 2.6.

32. The retroreflective element according to claim 1, wherein the solid spherical core has a core index of refraction; the first complete concentric optical interference layer has a first index of refraction that is greater than the core index of refraction; and the second complete concentric optical interference layer has a second index of refraction that is less than the first index of refraction.

33. The retroreflective element according to claim 32, wherein the core index of refraction is between about 1.55 and about 2.0; the first index of refraction is between about 2.0 and about 2.6; and the second index of refraction is between about 1.4 and about 1.7.

34. The retroreflective element according to claim 1, wherein the retroreflective element has a retroreflective color with chromaticity coordinates defining a point on the CIE chromaticity diagram (1931 version) that lies within 0.01 of the line that describes black body emission between 4800K and 7500K.

35. The retroreflective element according to claim 1, wherein the difference between the refractive index of the spherical core and the refractive index of the first complete concentric optical interference layer is greater than about 0.5; and wherein the difference between the refractive index of the first complete concentric optical interference layer and the refractive index of the second complete concentric optical interference layer is greater than about 0.5.

36. A pavement marking, comprising:
a substrate having a first major surface and a second major surface; and
a plurality of retroreflective elements according to claim 1, disposed along the first major surface of the substrate; wherein the pavement marking is retroreflective.

37. A garment comprising:
a garment surface having a plurality of retroreflective elements according to claim 1 disposed thereon.

38. A security laminate comprising:
a substrate having a first major surface and a second major surface; and
a plurality of retroreflective elements according to claim 1, disposed along the first major surface of the substrate; wherein the security laminate is retroreflective.

* * * * *

UNITED STATES PATENT AND TRADEMARK OFFICE
CERTIFICATE OF CORRECTION

PATENT NO. : 8,496,340 B2  
APPLICATION NO. : 12/808529  
DATED : July 30, 2013  
INVENTOR(S) : Kenton D Budd et al.

Page 1 of 1

It is certified that error appears in the above-identified patent and that said Letters Patent is hereby corrected as shown below:

In the Specification

<u>Column 7</u>
Line 61; Delete "retroflective" and insert -- retroreflective --, therefor.

<u>Column 18</u>
Line 4; Delete "retroflective" and insert -- retroreflective --, therefor.
Line 36; Delete "retroflective" and insert -- retroreflective --, therefor.

<u>Column 20</u>
Line 10; Delete "particulary" and insert -- particularly --, therefor.
Line 39; Delete "that that" and insert -- that --, therefor.

<u>Column 26</u>
Line 57; Delete "Oberursol," and insert -- Oberursel, --, therefor.
Line 67; Delete "Oberursol," and insert -- Oberursel, --, therefor.

Signed and Sealed this
Twenty-fourth Day of December, 2013

Margaret A. Focarino
*Commissioner for Patents of the United States Patent and Trademark Office*